(12) United States Patent
Tsutsui

(10) Patent No.: US 8,315,223 B2
(45) Date of Patent: Nov. 20, 2012

(54) MOBILE STATION, BASE STATION AND RADIO COMMUNICATION METHOD

(75) Inventor: Masafumi Tsutsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 696 days.

(21) Appl. No.: 12/401,741

(22) Filed: Mar. 11, 2009

(65) Prior Publication Data

US 2009/0196272 A1 Aug. 6, 2009

Related U.S. Application Data

(63) Continuation of application No. PCT/JP2006/317990, filed on Sep. 11, 2006.

(51) Int. Cl.
*H04W 4/00* (2009.01)
(52) U.S. Cl. ......... 370/330; 370/208; 370/484; 455/454
(58) Field of Classification Search .................. 370/334; 455/561, 562.1
See application file for complete search history.

(56) References Cited

U.S. PATENT DOCUMENTS

| 2003/0125040 | A1* | 7/2003 | Walton et al. ................. 455/454 |
| 2003/0185310 | A1 | 10/2003 | Ketchum et al. |
| 2005/0195103 | A1* | 9/2005 | Davis et al. ...................... 342/99 |
| 2006/0093065 | A1* | 5/2006 | Thomas et al. ............... 375/299 |
| 2006/0098568 | A1 | 5/2006 | Oh et al. |
| 2006/0279460 | A1* | 12/2006 | Yun et al. ...................... 342/377 |
| 2008/0108310 | A1* | 5/2008 | Tong et al. ...................... 455/69 |

FOREIGN PATENT DOCUMENTS

| JP | 2004-364094 | 12/2004 |
| JP | 2005-522086 | 7/2005 |
| JP | 2006-025328 | 1/2006 |
| JP | 2006-140853 | 6/2006 |
| JP | 2006-141013 | 6/2006 |
| WO | 2004/084420 | 9/2004 |
| WO | 2006/022372 | 3/2006 |
| WO | 2006/093385 | 9/2006 |

OTHER PUBLICATIONS

Senhua Huang, Ling Qiu, "A Novel Receiver Aided Beamforming Technique," 2005 IEEE 16th International Symposium on Personal, Indoor and Mobile Radio Communications, vol. 4, pp. 2447-2451, Sep. 14, 2005.
PCT International Search Report of Japanese Patent Office for corresponding application PCT/JP2006/317990, dated Dec. 4, 2006.
Japanese Patent Office "Notice of Rejection" issued for corresponding Japanese Patent Application No. 2008-534162, mailed May 31, 2011. Partial English translation attached.
R1-06795; 3GPP TSG WG1 Meeting #44BIS, Athens, Greece, Mar. 27-31, 2006 Panasonic, Feedback for UE Measurement for MIMO, 10.31 Discussion (2 pages).
Notice of Rejection and English Translation Thereof for Corresponding JP Application 2008-534162 Mailed Oct. 4, 2011.

\* cited by examiner

*Primary Examiner* — Ricky Ngo
*Assistant Examiner* — Richard K Chang
(74) *Attorney, Agent, or Firm* — Myers Wolin, LLC

(57) ABSTRACT

A mobile station that receives multibeam data in precoding Multiple Input Multiple Output (MIMO) from a base station, using a plurality of antennas, includes: a code book that includes contents identical to contents of a code book installed in the base station and that includes information of beam selection for precoding; and a control unit that determines a weight for carrying out optimum beam selection for precoding at time of searching information in the code book, based on a state of a beam in each resource block of received data that is divided into a plurality of resource blocks in a radio communication band, to transmit the weight as feedback information to the base station.

14 Claims, 23 Drawing Sheets

MOBILE STATION, BASE STATION AND RADIO COMMUNICATION METHOD

CROSS-REFERENCE TO RELATED APPLICATIONS

This is a continuation of Application PCT/JP2006/317990, filed on Sep. 11, 2006, now pending, the contents of which are herein wholly incorporated by reference.

FIELD

The embodiments discussed herein are related to a mobile station, base station and a radio communication method.

BACKGROUND

In an OFDMA mobile communication system, frequency resources are assigned to multiple access users in resource blocks each containing a group of consecutive subcarriers. Currently, the standardizing institution is discussing a frequency bandwidth for each resource block around the core frequency of 375 kHz. Specifically, the effect of fading occurring in a mobile communication environment is reduced by optimum resource assignment in adoption of multiuser scheduling to improve the maximum throughput of the system. According to this, a bandwidth for each resource block is determined so that the effect of fading becomes virtually flat in the band, and, therefore, a degree of fading varies greatly between different resource blocks.

A study of precoding MIMO has been in progress for the purpose of a further improvement in throughput and in communication quality. In precoding MIMO, the number of data streams and a transmission beam in MIMO are changed depending on a communication environment to be able to optimize both beam forming gain and throughput (see, e.g., Published Japanese translation of a PCT application No. 2005-522086 (hereinafter "Patent Document 1")).

In a certain wide-band radio connection system using a multiple antenna in MIMO, precoding information, etc., for the multiple antenna is transmitted in the form of a message through a downlink to give an instruction to a terminal unit (see, e.g., Japanese Laid-Open Patent Application Publication No. 2006-141013 (hereinafter "Patent Document 2")).

A concept of a resource block in OFDMA will then be described. FIG. 21 depicts resource blocks in OFDMA. For example, as depicted in FIG. 21, subcarriers f1 to fN are divided into a plurality of resource blocks (RB) (#1 to #n, and for example, n=12) in given unit frequency (375 kHz) (total frequency range 5 MHz=375 kHz×12). Conventionally, a mobile station at the reception side selects one subcarrier from each of n resource blocks to select n optimum subcarriers (beams) in total and feeds the selected subcarriers back to a base station.

FIG. 22 is a block diagram of a conventional radio communication system. A base station 10 and a mobile station 50 are each equipped with a radio communication apparatus. A precoder 11 of the base station 10 receives input data streams, selects a beam according to a code book 12 when carrying out beam selection, and outputs a plurality of pieces of data (four pieces of data in FIG. 22). To each piece of output data from the precoder 11, a pilot signal of an orthogonal component (orthogonal pilot) is added by an adding unit 13. A transmitting unit 14 modulates the data to output the modulated data via a plurality of antennas 15. A control unit 16 specifies a value to be read out of the code book 12 at the time of beam selection, based on input data from the mobile station 50, and gives the specified vale to the precoder 11.

The mobile station 50 receives data via a plurality of antennas 51 (two antennas in FIG. 22). The received data is input to a channel estimating unit 52, which estimates a channel using an orthogonal pilot component contained in the received transmitted data. A demodulator 53 demodulates stream data to output demodulated data. The mobile station 50 has a code book 54 whose contents are identical to those of the code book of the base station 10. A beam measuring unit 55 determines an ID (weight) for precoding, based on a channel estimation value estimated by the channel estimating unit 52 and the contents of the code book 54. At this time, the beam measuring unit 55 measures a beam having the maximum SINR (SIR), and determines a weight for a beam for each of n resource blocks. A selecting unit 56 ranks beams for each resource block to select an optimum beam, and transmits the selected beam as a feedback signal to the base station 10. The beam measuring unit 55 and the selecting unit 56 make up a control means in the mobile station 50.

FIG. 23 depicts a conventional method of determining a weight. The beam measuring unit 55 of FIG. 22 determines one weight for each of n resource blocks (RB), thus determining n weights in total. The selecting unit 56 applies determined n weights to n resource blocks (RB), respectively, to transmit weighted beams to the base station 10.

The technique for MIMO precoding described in Patent Document 1, however, does not disclose the use of resource blocks and determination of a weight in OFDMA. By this technique, therefore, optimizing precoding through MIMO at the base station 10 is impossible, whereby transmission quality in communication may not be improved. Likewise, the technique described in Patent Document 2 does not disclose a configuration related to determination of a weight for precoding. By this technique, therefore, optimizing precoding through MIMO at the base station 10 is impossible, whereby transmission quality in communication may not be improved.

MIMO precoding desires not only improved weight determination but also improved transmission quality in transmission of a feedback signal containing a determined weight from the mobile station 50 to the base station 10. In a configuration according to a conventional technique (depicted in FIG. 22, etc.), feedback information carries a weight for each resource block in transmission. Because of this, the base station 10 is incapable of accurately receiving the feedback information due to a change in the reception environment of a transmission path, etc., which makes impossible an improvement in the transmission quality of the feedback information. As a result, optimizing precoding through MIMO may not be achieved, whereby transmission quality in communication may not be improved.

SUMMARY

According to an aspect of an embodiment, a mobile station that receives multibeam data under a precoding Multiple Input Multiple Output (MIMO) scheme from a base station, using a plurality of antennas, includes: a code book that includes contents identical to contents of a code book installed in the base station and that includes information of beam selection for precoding; and a control unit that determines a weight for carrying out optimum beam selection for precoding at time of searching information in the code book, based on a state of a beam in each resource block of received data that is divided into a plurality of resource blocks in a radio communication band, to transmit the weight as feedback information to the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

Figure 1:
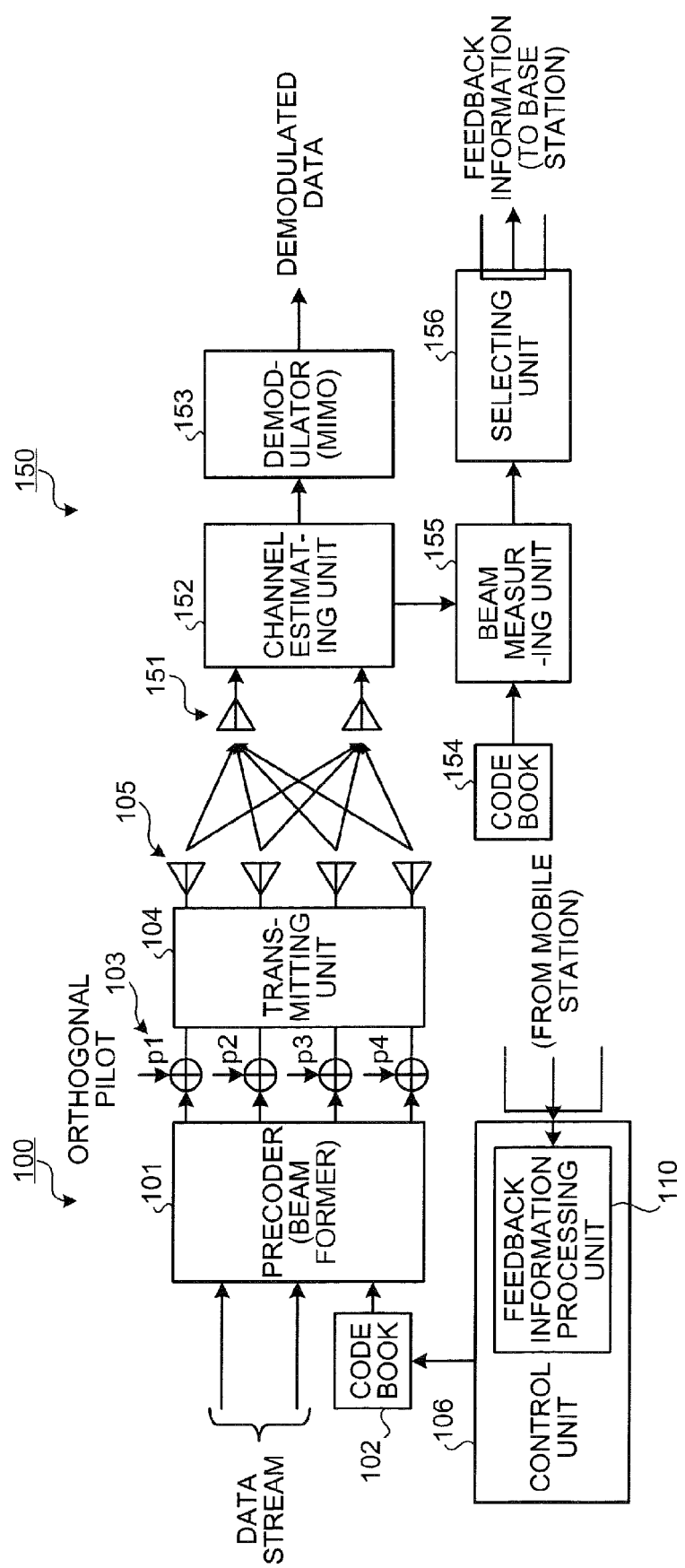
FIG. 1 is a block diagram of a radio communication apparatus according to an embodiment.

FIG. 1 is a block diagram of radio communication apparatuses according to an embodiment. FIG. 1 depicts a base station 100 and a mobile station 150 that make up a radio communication system.

A precoder 101 of the base station 100 receives input data streams, carries out weight multiplication for beam forming according to a code book 102 at the time of beam selection, and outputs a plurality of streams of data (four streams of data in FIG. 1). The code book 102 stores thereon a plurality of preset values (corresponding to the number of combinations of streams) for giving a weight corresponding to each of beams forming a multibeam to each stream of data.

To each of output signals from the precoder 101, a pilot signal of an orthogonal component (orthogonal pilot) is added by an adding unit 103. A transmitting unit 104 modulates the output data into data having a radiofrequency, and outputs the modulated data via a plurality of antennas 105. A control unit 106 specifies a value to be read out of the code book 102 at the time of beam selection, based on feedback information (feedback signal) transmitted from the mobile station 150, and gives the value to the precoder 101. This enables transmission of data having undergone optimum beam forming to the mobile station 150. A feedback information processing unit 110 carries out a reception process, which will be described later, on feedback information transmitted from the mobile station 150.

The mobile station 150 receives a signal via a plurality of antennas 151 (two antennas in FIG. 1). The received signal is input to a channel estimating unit 152, which estimates a channel using an orthogonal pilot component contained in the received transmitted signal. A demodulator 153 demodulates stream data to output demodulated data. The mobile station 150 has a code book 154 whose contents are identical to those of the code book of the base station 100. A beam measuring unit 155 determines an ID (weight) for precoding for each of a plurality of resource blocks, based on a channel estimation value estimated by the channel estimating unit 152 and the contents of the code book 154. At this time, the beam measuring unit 155 measures, for example, a beam having the maximum SINR (SIR), and determines a weight for a beam for each of n resource blocks. A selecting unit 156 synthesizes weights each determined for a beam for each of the resource blocks, applies a synthesized weight to the resource blocks (copy process, etc., to be described later), and transmits the synthesized weight as feedback information to the base station 100.

Figure 2:
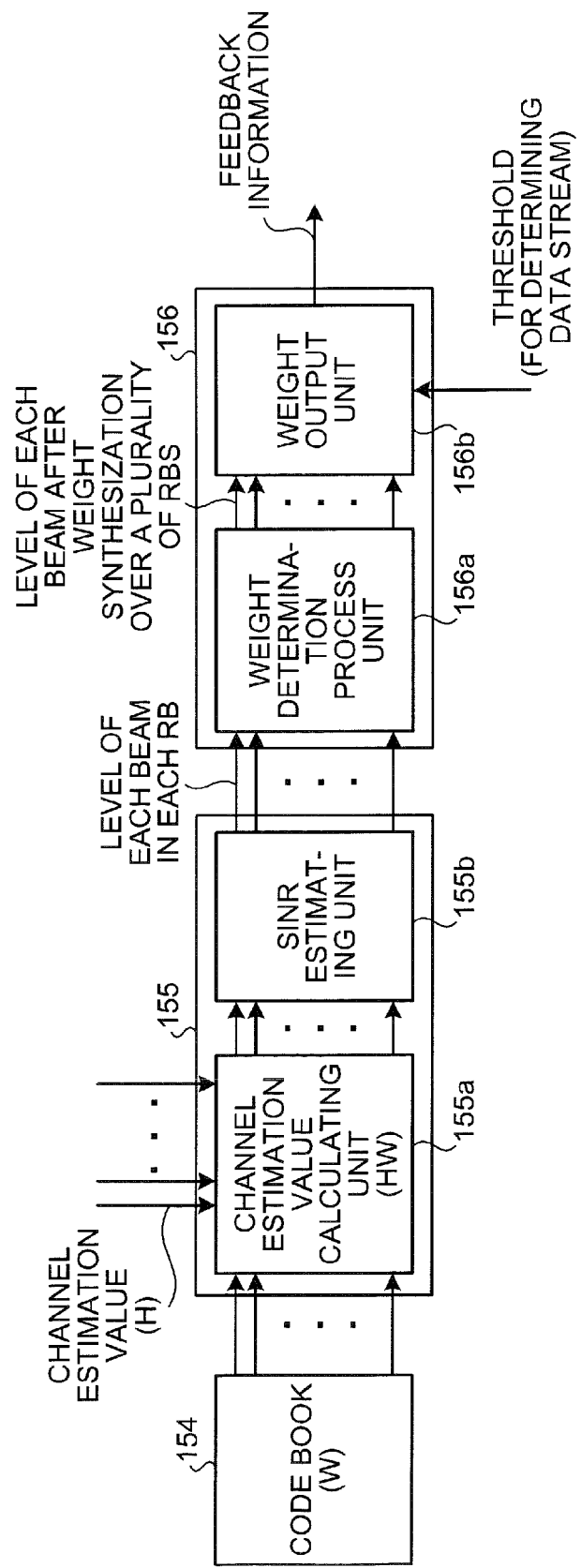
FIG. 2 is a diagram depicting a partial configuration of a mobile station.

FIG. 2 is a diagram depicting a partial configuration of the mobile station. FIG. 2 illustrates a detailed configuration of the beam measuring unit 155 and the selecting unit 156 of the mobile station 150 of FIG. 1. The beam measuring unit 155 includes a channel estimation value calculating unit 155a and an SINR estimating unit 155b. The channel estimation value calculating unit 155a calculates a channel estimation value HW of each beam, based on a channel estimation value H output from the channel estimating unit 152 and a weight W set in the code book 154. The SINR estimating unit 155b estimates the level (SINR) of each beam based on the channel estimation value HW of each beam. The level of each beam may be estimated in terms of signal power, instead of being estimated in terms of SINR. The beam measuring unit 155 outputs the level of each beam in each of the resource blocks to the selecting unit 156. The selecting unit 156 includes a weight determining process unit 156a and a weight output unit 156b.

Figure 3:
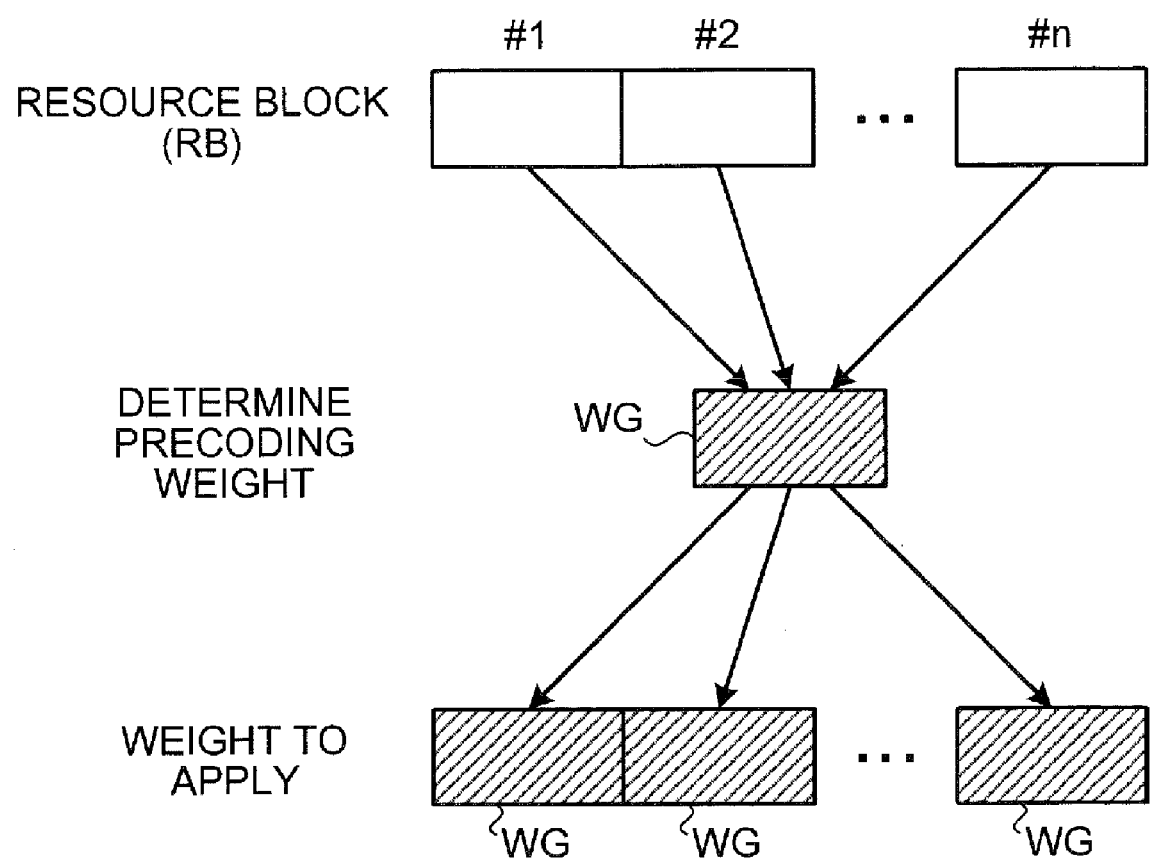
FIG. 3 is a diagram depicting a weight determining process.

FIG. 3 is a diagram depicting a weight determining process. The weight determining process unit 156a synthesizes the levels of beams in a plurality of resource blocks (#1 to #n) to determine one precoding weight WG that is used for beam selection at the base station 100. The weight output unit 156b applies (copies) one weight resulting from synthesization by the weight determining process unit 156a to one or a plurality of resource blocks, and transmits one weight as feedback information to the base station 100. In FIG. 3, the weight WG of the same value is copied to each of the plurality of resource blocks (#1 to #n), and is, therefore, transmitted in a redundant state through a transmission path to the base station 100. A threshold for determining a data stream is input to the weight output unit 156b. Feedback information thus contains a transmission beam ID for beam selection, information on selection of the number of data streams, and the weight above.

Figure 4:
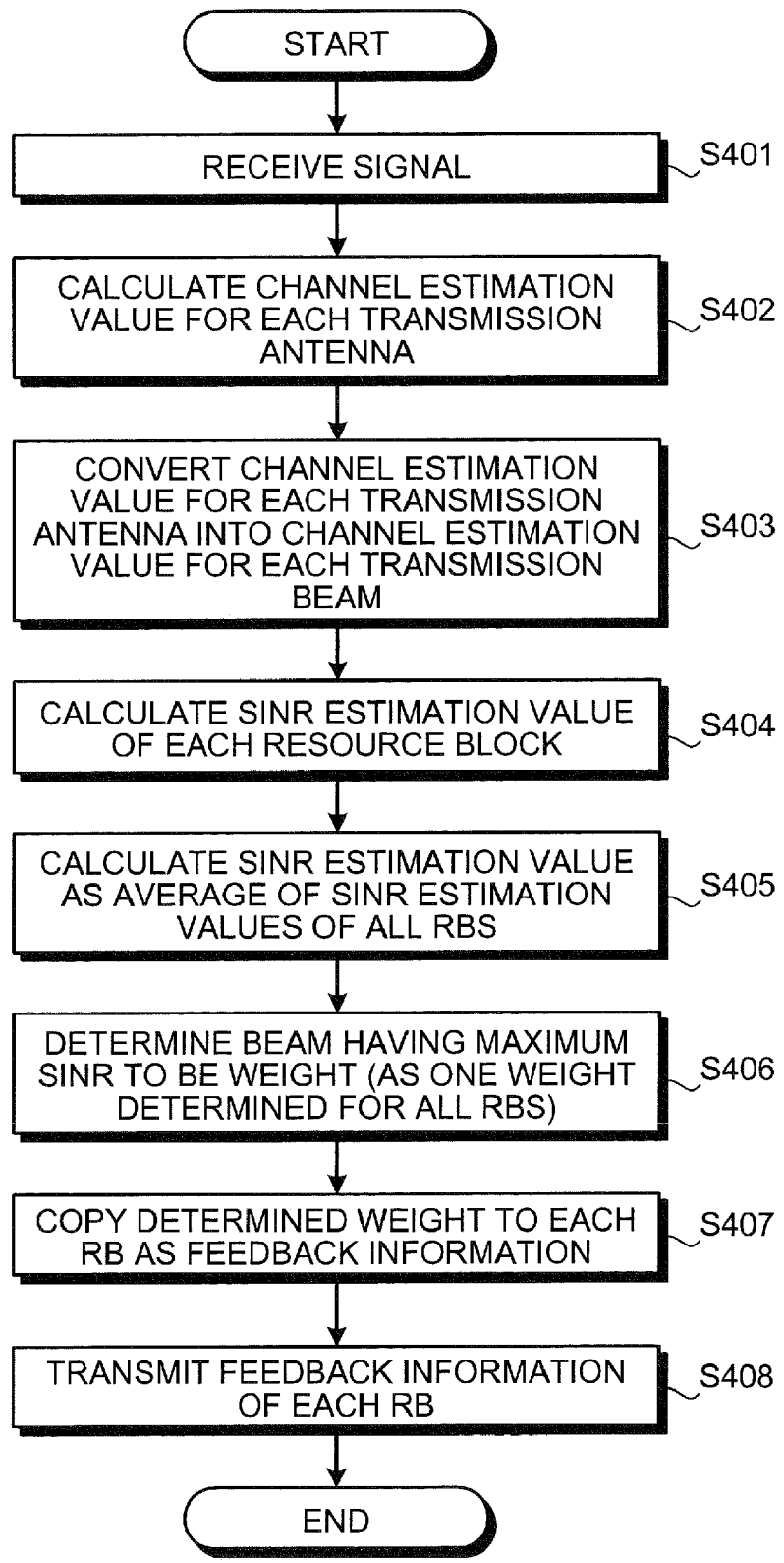
FIG. 4 is a flowchart of a weight determining process conducted by a mobile station.

FIG. 4 is a flowchart of a weight determining process conducted by a mobile station. First, the mobile station 150 receives a signal from the base station 100 (step S401). Next, the channel estimation value calculating unit 155a of the beam measuring unit 155 calculates a channel estimation value for each transmission antenna (step S402), and converts the calculated channel estimation value into a channel estimation value for each transmission beam (step S403). The SINR estimating unit 155b calculates an SINR estimation value of each resource block (step S404), and calculates an SINR estimation value that is given as the average of the levels of beams of all resource blocks (RB) (step S405).

The weight determining process unit 156a of the selecting unit 156 determines a beam having the maximum SINR to be a weight (step S406). As depicted in FIG. 3, one weight is determined out of weights for all resource blocks (RB). The weight output unit 156b copies one weight determined at step S406 to each resource block (RB) as feedback information (step S407), and transmits one weight as feedback information of the resource blocks (RB) (#1 to #n) to the base station 100 (step S408).

Figure 5:
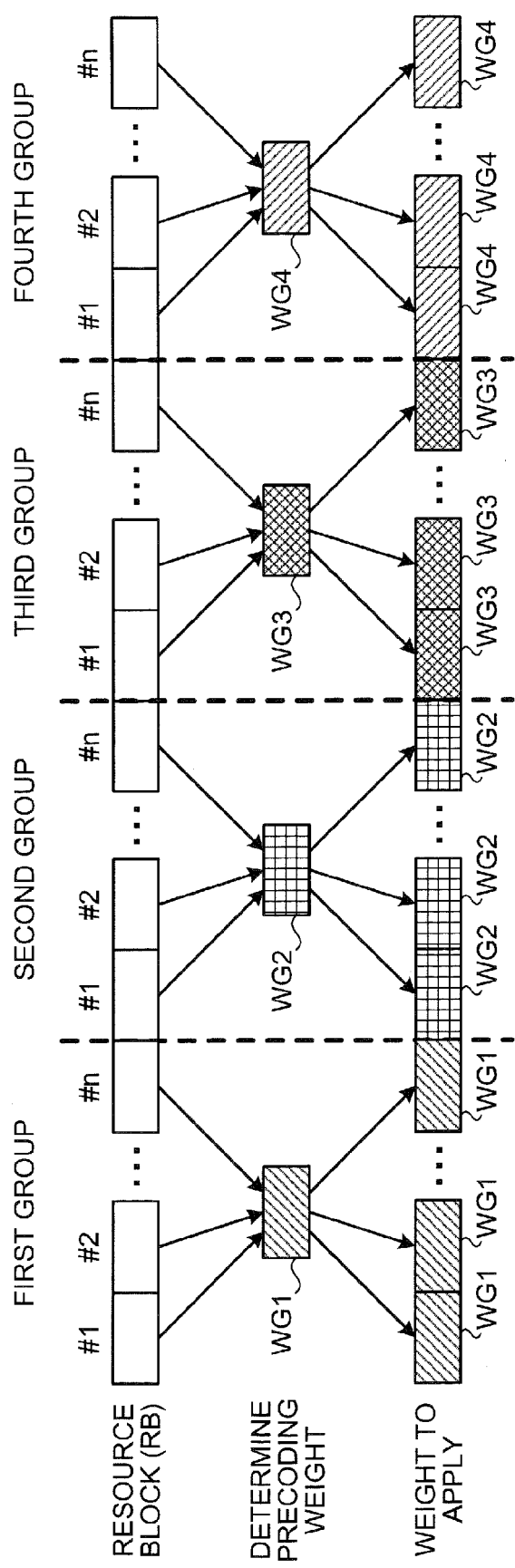
FIG. 5 is a diagram depicting a weight determining process for each resource block.

FIG. 5 is a diagram depicting a weight determining process for each resource block, specifically the process of FIG. 4. A frequency band for radio communication (e.g., bandwidth of 20 MHz) is divided into a plurality of groups (four groups of bandwidths of 5 MHz in the process of FIG. 5), and one weight WG for precoding is determined for each group. For example, in a group 1, the levels of beams in a plurality of resource blocks (#1 to #n) are synthesized to determine one weight WG1. In the same manner, weights WG2 to WG4 are determined in groups 2 to 4, respectively. One weight is determined for each group, yielding the weights WG1 to WG4, and is copied to every resource block in each group as feedback information.

According to the above configuration, a radio communication frequency bandwidth is divided into a plurality of groups, each of which is then divided into a plurality of resource blocks. The mobile station 150 determines one weight for precoding for each group by the synthesizing process to take the determined weight as feedback information. In this manner, a weight is determined collectively for a plurality of resource blocks to apply the same weight to the resource blocks. This offers a specific precoding characteristic better than a conventional precoding characteristic resulting from weight determination on a resource-block-to-resource-block basis. This is based on the fact that a weight for precoding shows coherence in a range greater than a frequency bandwidth of a resource block. In addition, because feedback information of the same weight applied to a plurality of resource blocks is transmitted in a redundant state through the transmission path, the base station 100 is able to reduce signal errors contained in the incoming feedback information, which will be described later.

Figure 6:
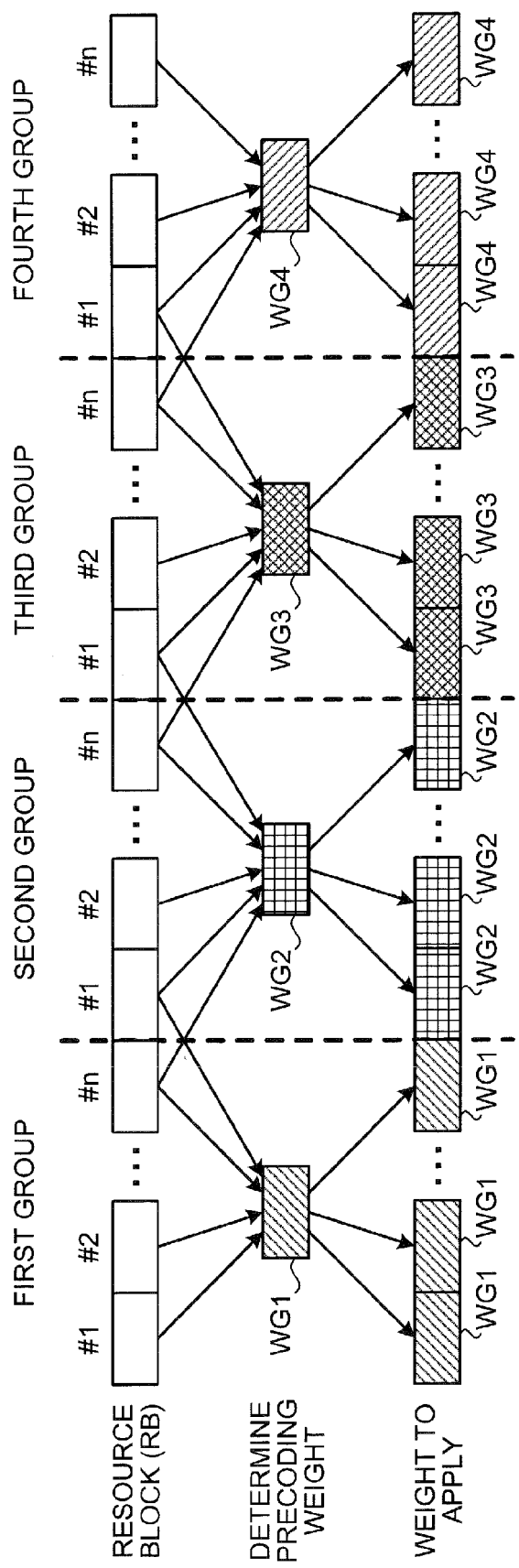
FIG. 6 is a diagram depicting a weight determining process for each resource block.

FIG. 6 is a diagram depicting a weight determining process for each resource block. The process of FIG. 6 is different from the process of FIG. 5 in that in the vicinity of the boundary between groups, information of a resource block (beam level) of an adjacent another group that is situated in the boundary is also subjected to synthesization. A frequency band for radio communication (e.g., bandwidth of 20 MHz) is divided into a plurality of groups (four groups of bandwidths of 5 MHz in FIG. 5), and one weight WG for precoding is determined for each group.

For example, in the group 2, the levels of beams in the plurality of resource blocks (#1 to #n) are synthesized, and the levels of one (depicted in FIG. 6) or a plurality of beams near the boundary between the group 2 and the group 1 and near the boundary between the group 2 and the group 3 are also synthesized to determine one weight WG2. In the same manner, the weights WG1, WG3, and WG4 are determined in the groups 1, 3, and 4, respectively. Each of the weights WG1 to WG4, which is one weight determined for each group, is copied to every resource block in each group as feedback information.

According to the above configuration, a weight can be determined using more information, compared to the method of FIG. 5 by which a weight is determined in a closed information range in a group. Thus, the precision of beam measuring by the beam measuring unit 155 is improved.

Figure 7:
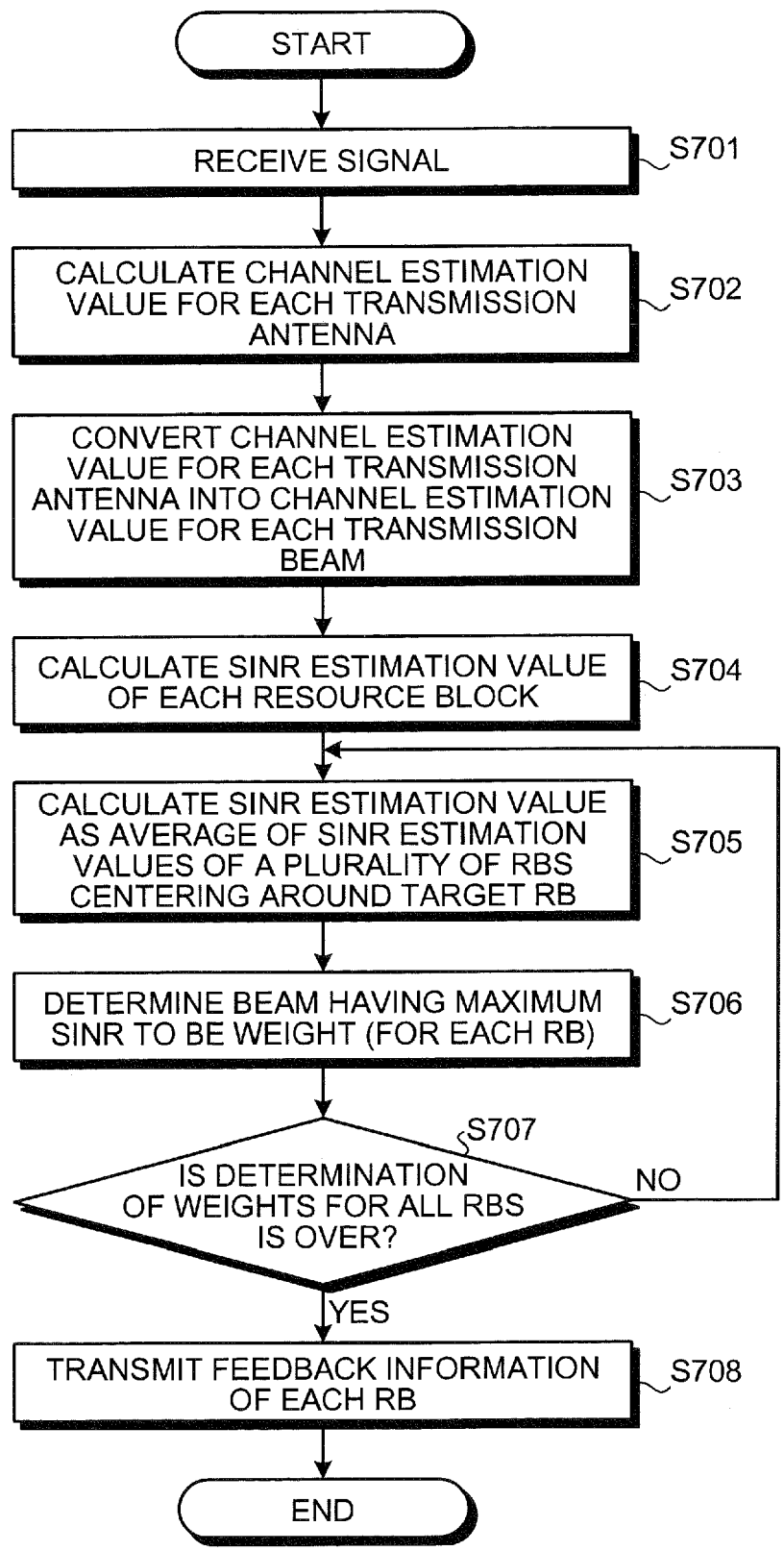
FIG. 7 is a flowchart of a weight determining process conducted by a mobile station.

FIG. 7 is a flowchart of a weight determining process conducted by a mobile station. First, the mobile station 150 receives a signal from the base station 100 (step S701). Next, the channel estimation value calculating unit 155a of the beam measuring unit 155 calculates a channel estimation value for each transmission antenna (step S702), and converts the calculated channel estimation value into a channel estimation value for each transmission beam (step S703). The SINR estimating unit 155b calculates an SINR estimation value of each resource block (step S704), and calculates an SINR estimation value that is given as the average of the levels of beams in a plurality of predetermined resource blocks (RB) centering around one target resource block (target RB) (step S705).

Subsequently, the weight determining process unit 156a of the selecting unit 156 determines a beam having the maximum SINR to be a weight (step S706). Through this process, one weight is determined for one resource block. Afterward, whether determination of weights for all resource blocks (RB) is finished is determined (step S707). If determination of weights for all resource blocks is not finished yet (step S707: NO), the process at step S705 is executed again to determine a weight for a different resource block. When determination of weights for all resource blocks is completed (step S707: YES), the weight output unit 156b applies the weight determined at step S706 to the corresponding resource block (RB) as feedback information, thus transmits the feedback information of the plurality of resource blocks (RB) (#1 to #n) to the base station 100 (step S708).

Figure 8:
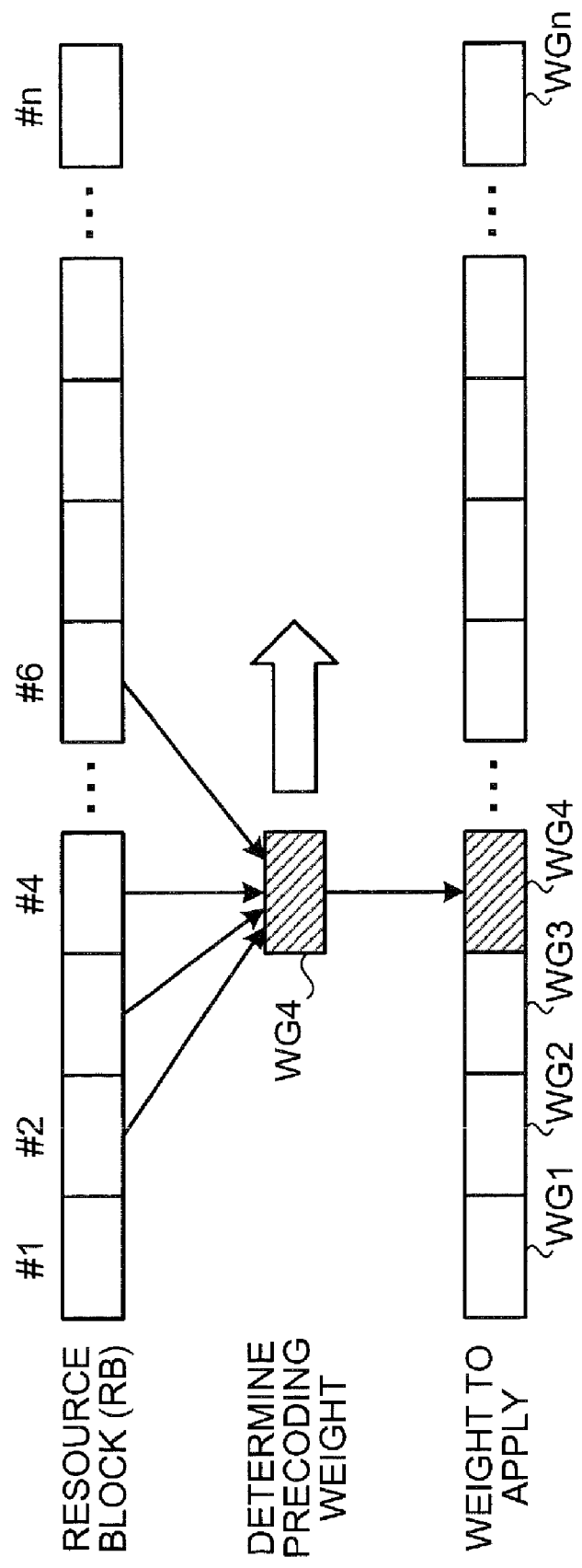
FIG. 8 is a diagram depicting a weight determining process for each resource block.

FIG. 8 is a diagram depicting a weight determining process for each resource block, specifically the process of FIG. 7. As depicted in FIG. 8, this third weight determining method does not involve the concept of group. FIG. 8 depicts a situation where a weight for a resource block #4 is about to be determined when weights for resource blocks #1 to #3 are determined already.

A precoding weight for the resource block #4 is determined by averaging the levels of beams in five resource blocks (#2 to #6) centering around the target resource block #4 in close proximity thereto. The number of resource blocks used for the determination can be set arbitrarily. Likewise, a precoding weight for a resource block #5 is determined by averaging the levels of beams in five resource blocks (#3 to #7) centering around the resource block #5 in close proximity thereto. In this manner, each precoding weight is determined as a target resource block is shifted in sequence. Hence weights WG1 to WGn for the plurality of resource blocks (#1 to #n) are determined, respectively, as feedback information.

The configuration above is identical to the configuration of the first and second determining methods in that one weight is determined from a plurality of resource blocks by synthesization, but is different in that one determined weight is not copied to each of resource blocks but each weight is determined by calculation for each resource block. The above configuration does not restrict weight determination within a group, but allows weight determination in a given range in which frequency bands are close to each other. This improves the precision of beam measurement by the beam measuring unit 155, thus improves the precision of feedback information of each resource block.

Figure 9:
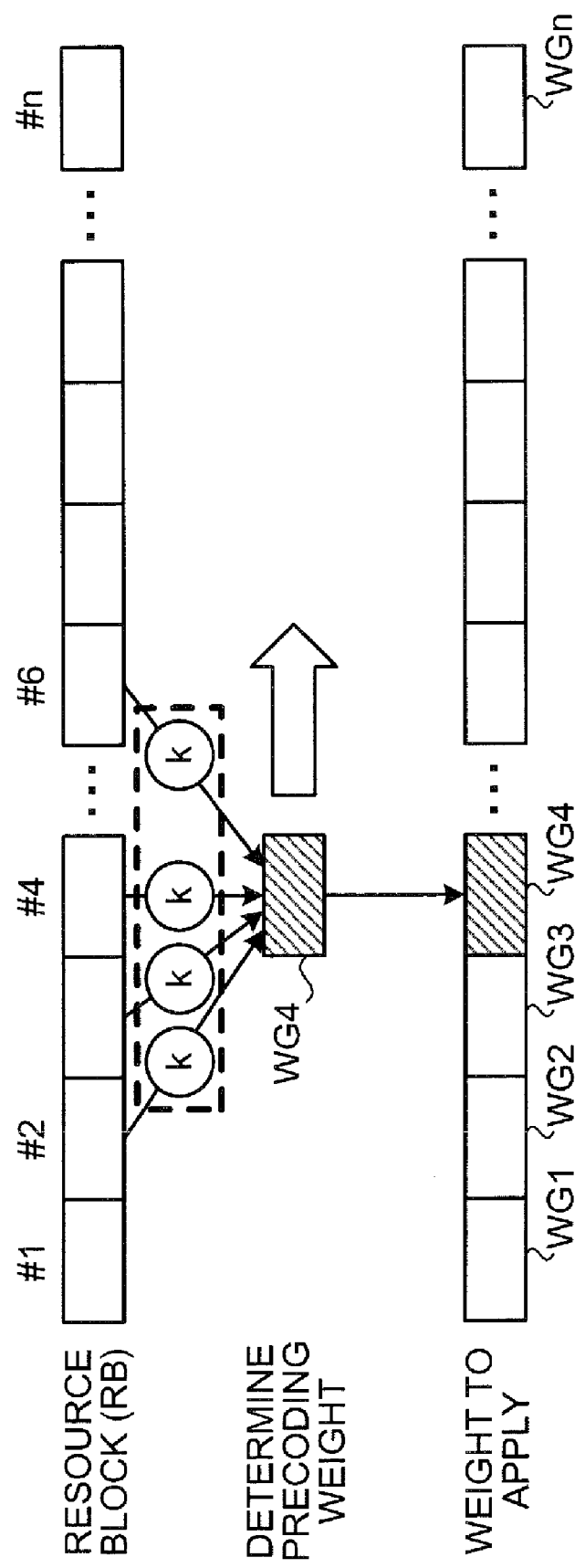
FIG. 9 is a diagram depicting a weight determining process for each resource block.

FIG. 9 is a diagram depicting a weight determining process for each resource block. The process of FIG. 9 is different from the process of FIG. 8 in that information of a resource block to be determined in weight is given heavier weight and that information of a resource block is given lighter weight as the resource block gets farther away from a resource block to be determined in weight.

For example, when a weight for the resource block #4 of FIG. 9 is determined, a weight factor k to the level of a beam in the target resource block #4 is set high. In contrast, weight factors k to the levels of beams in the resource blocks #2 and #6 farthest from the resource block #4 are set low. Weight factors k to the levels of beams in the resource blocks #3 and #5 (not depicted) located between the resource block #4 and the resource blocks #2 and #6 are set between the highest and the lowest. In this manner, a weight can be determined by increasing the rate of the level of beam in the target resource block #4 that is originally necessary while considering the levels of beams in resource blocks adjacent to the resource block #4. This enables weight determination in a given range in which frequency bands are close to each other, thus improves the precision of beam measurement by the beam measuring unit 155 and also improves the precision of feedback information of each resource block.

Figure 10:
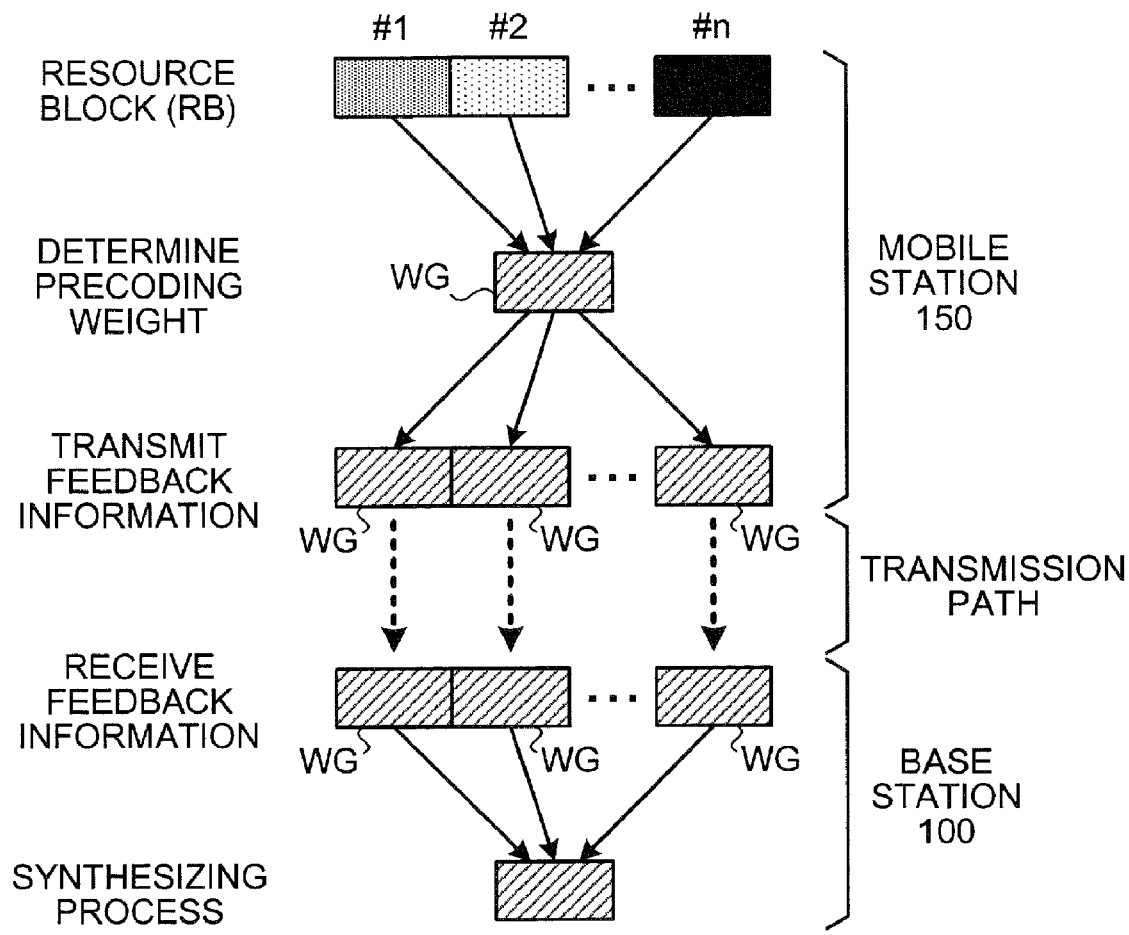
FIG. 10 is a diagram depicting a method of transmitting feedback information.

A method of transmitting feedback information from the mobile station 150 to the base station 100 will be described. FIG. 10 is a diagram depicting a method of transmitting feedback information. By any one of the above weight determining methods, a weight for each resource block is transmitted as feedback information from the mobile station 150 through the transmission path to the base station 100, where the feedback information processing unit 110 receives the feedback information to carry out a reception process.

When weights for the resource blocks #1 to #n are equal since the weight is copied as in the case of the above first and second weight determining methods, feedback information of the same contents is transmitted through the transmission path in the form of redundant n pieces of information. Usually, transmission power of an uplink (UL) from the mobile station 150 is low, so that the quality of information transmission through the uplink is lower than that through a downlink (DL). This may result in an error in feedback information received by the base station 100. As depicted in FIG. 10, however, when feedback information of the same contents is transmitted in a redundant state via the resource blocks #1 to #n, the feedback information of the same contents is increased in terms of information volume in transmission, which leads to an improvement in transmission quality.

The base station 100 synthesizes the received feedback information. Even if information error occurs in a certain resource block, therefore, the base station 100 is able to cancel that error by the synthesization process. A feedback information receiving process (synthesizing process) carried out by the feedback information processing unit 110 of the base station 100 includes such steps of not using information of a resource block in which an error is detected, and selecting proper feedback information contents out of a plurality of feedback information contents by majority decision, which will be described in detail later. This first method of transmission can apply to a case where respective weights for the resource blocks #1 to #n are different in value from each other, as in the case of the above third and fourth weight determining methods.

Figure 11:
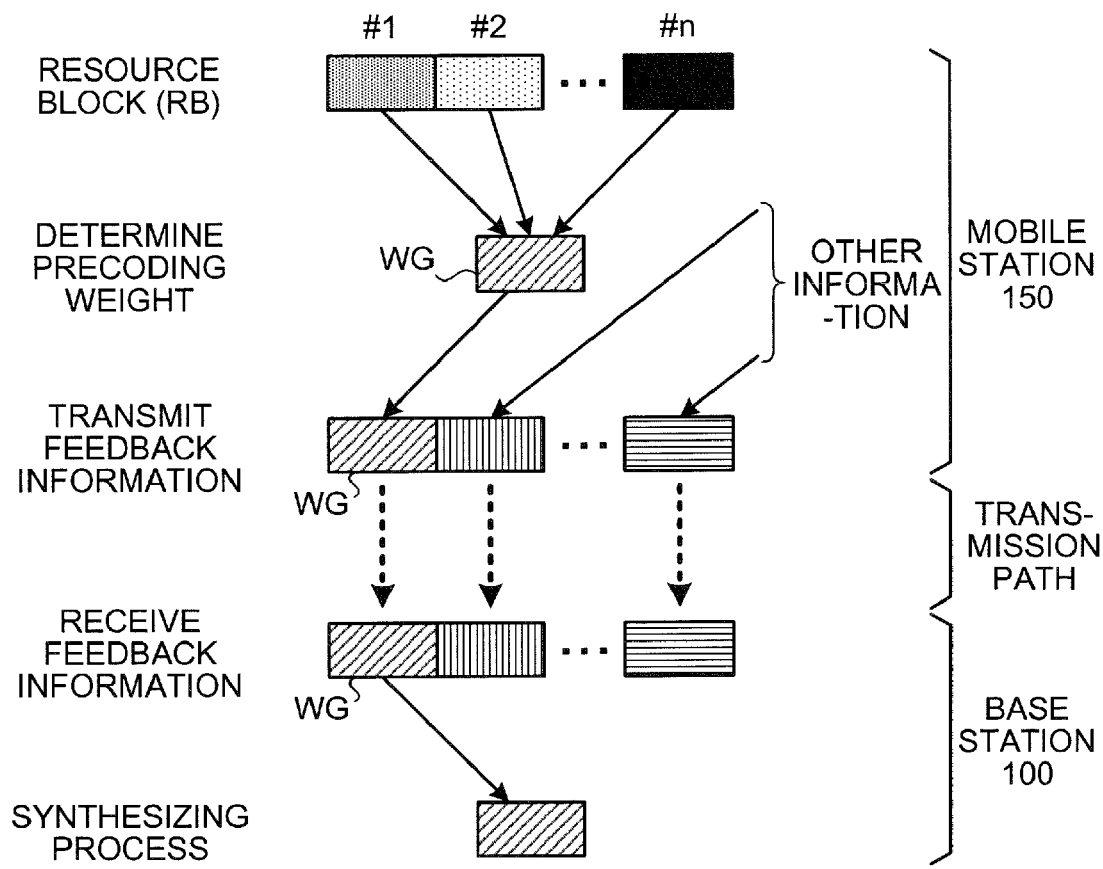
FIG. 11 is a diagram depicting a method of transmitting feedback information.

FIG. 11 is a diagram depicting a method of transmitting feedback information. According to the above first method of transmission, pieces of feedback information corresponding to the number of resource blocks are transmitted. As depicted in FIG. 11, however, another configuration may be adopted such that feedback information is transmitted using at least one or more resource blocks while other available resource blocks are used for transmission of other information, such as communication data. In this case, to improve the transmission quality of feedback information, feedback information of the same weight is transmitted in a redundant state using two or more resource blocks. When this second method of transmission is used, a resource block used for transmitting a weight or a resource block used for transmitting other information is set in advance between the base station 100 and the mobile station 150. The feedback information processing unit 110 of the base station 100 extracts weight information and other information separately from received feedback information.

The above configurations for weight determination and transmission of feedback information apply to a case where the base station 100 selects a beam to transmit in precoding MIMO transmission (beam selection). Beam selection and antenna selection will be described.

In FIG. 1, when the number of the antennas 105 of the base station 100 is Nt and the number of the antennas 151 of the mobile station 150 is Nr, it is easier to provide the base station 100 with more antennas compared to the mobile station 150, so that Nt is at least equal to Nr. In MIMO transmission, therefore, Ns data streams fewer than Nr antennas of the mobile station 150 are transmitted. In OFDMA combined with multiuser scheduling, the state of a channel is determined by resource block to be included in feedback information.

One method of transmitting Ns data streams fewer than Nt transmission antennas is selection of a transmission antenna. Antenna selection offers a transmission selection diversity effect resulting from fading and an antenna is selected for each resource block. As a result, the base station 100 receives feedback information of each resource block.

In precoding MIMO transmission, transmission beam selection is carried out to transmit data streams in the form of beams fewer than transmission antennas. Transmission beam selection offers an effect of beam forming as a major effect, which is different from the above diversity effect resulting from fading. A beam direction in beam forming is virtually the same across a plurality of resource blocks. This enables an improvement in the characteristics of transmission data, and offers an advantage of reducing the volume of feedback information, as described above.

As described above, when streams of data fewer than transmission antennas are transmitted, the method of antenna selection and the method of beam selection are available. When attention is turned to a plurality of resource blocks, antenna selection for each resource block is considered to be desirable because a fading effect on the resource blocks varies by block to block. A resource block, however, is not necessarily an optimum unit for beam selection. In this connection, characteristics resulting from selection in resource blocks (375 kHz) and from selection in the whole 5 MHz band are simulated.

Figure 12:
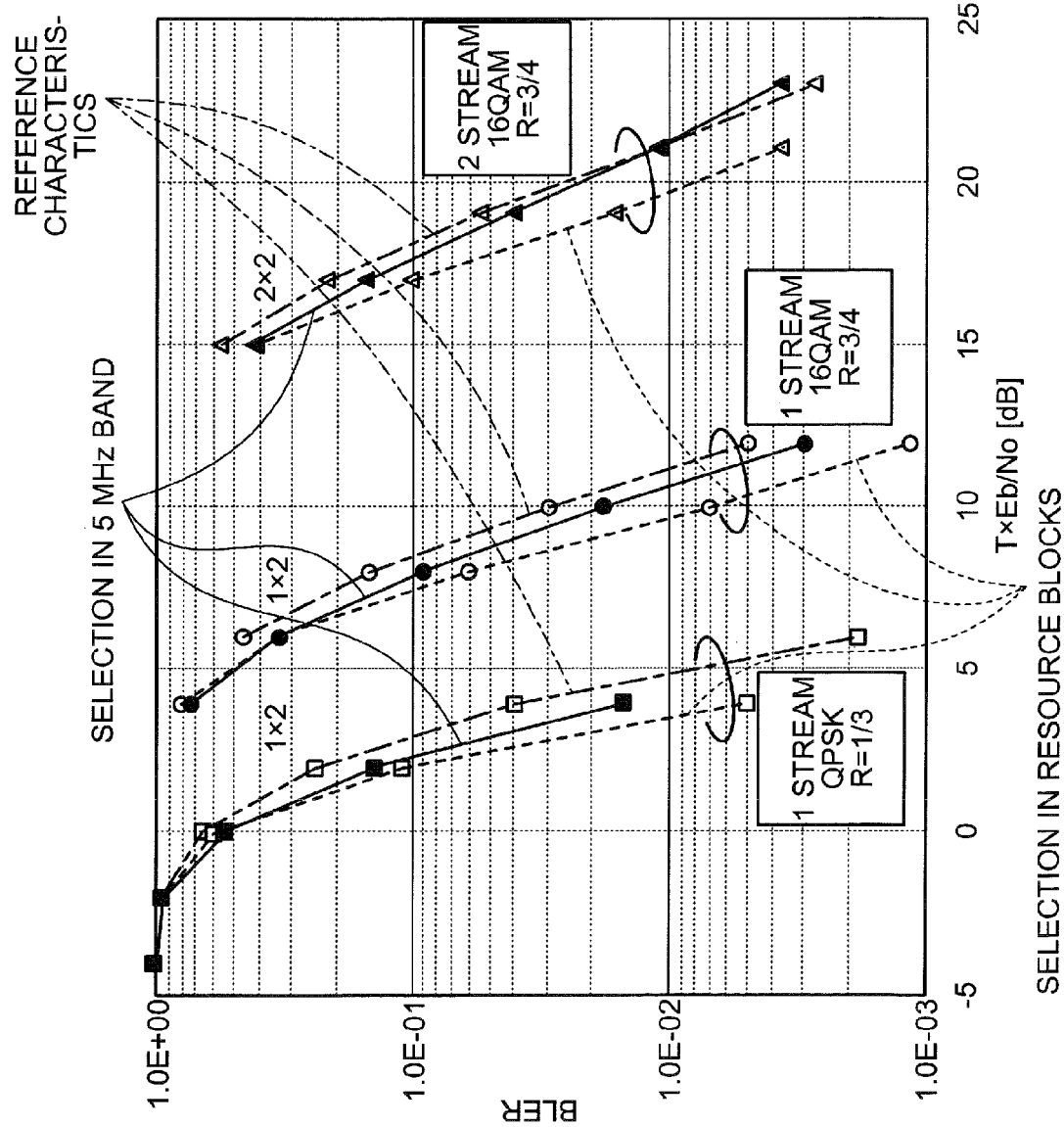
FIG. 12 is a diagram depicting simulated characteristics of Block Error Rate (BLER) in a case of ordinary antenna selection.

FIG. 12 is a diagram depicting simulated characteristics of Block Error Rate (BLER) in a case of ordinary antenna selection. The simulated characteristics are a result of modulation methods of one-stream QPSK, one-stream 16 QMA, and two-stream 16 QAM. As depicted in FIG. 12, in antenna selection, the characteristics are better when selection in resource blocks (white squares, circles, and triangles on dotted lines in FIG. 12) is carried out than when selection in the 5 MHz band (black squares, circles, and triangles on continuous lines in FIG. 12) is carried out without using the resource-block method. FIG. 12 also depicts reference characteristics resulting from 1×2 transmission (by which one data stream is transmitted with one transmission antenna and two reception antennas) and 2×2 transmission (by which two data streams are transmitted with two transmission antennas and two reception antennas) (single-dot chain lines in FIG. 12).

Figure 13:
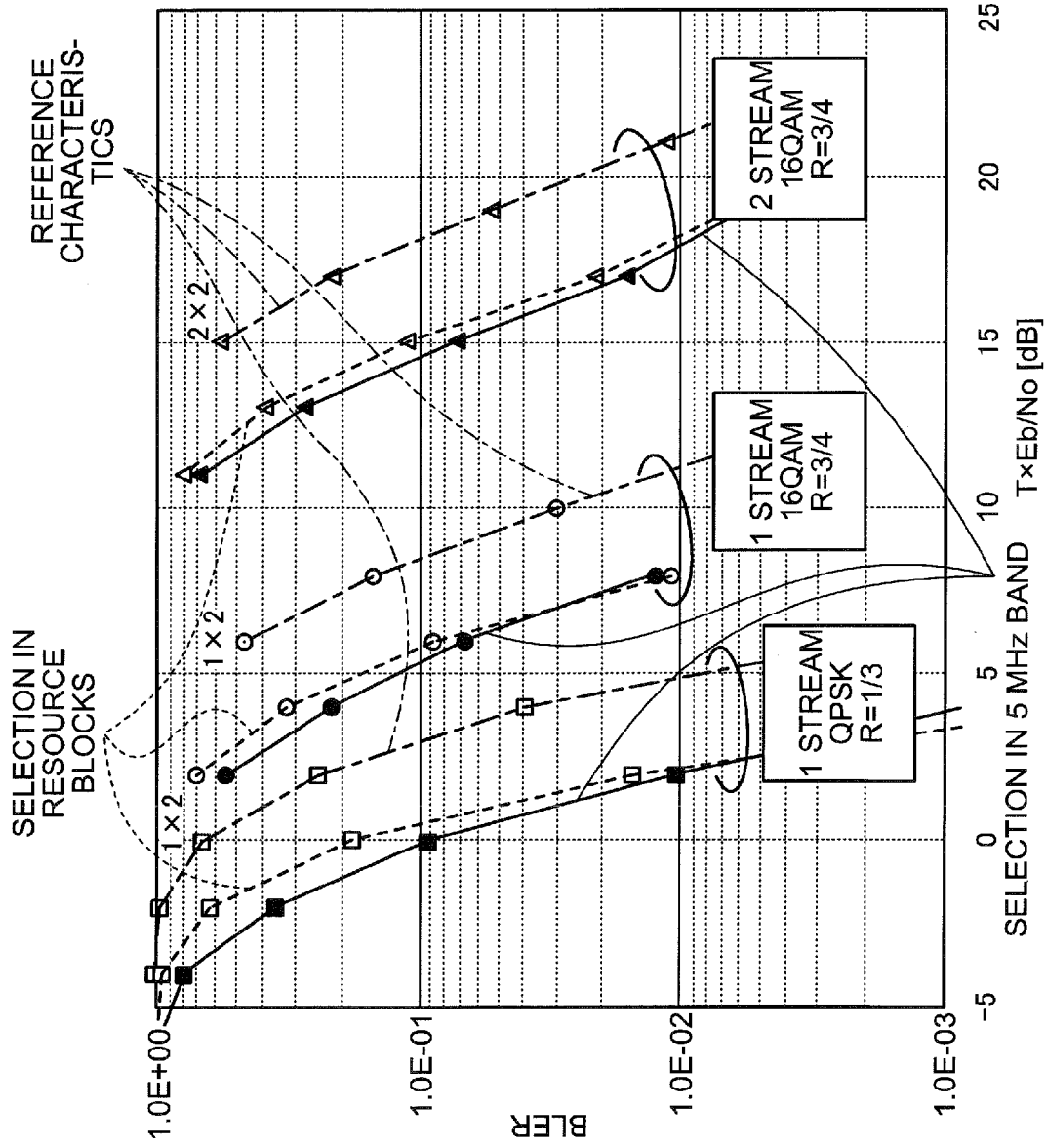
FIG. 13 is a diagram depicting simulated characteristics of Block Error Rate (BLER) in a case of beam selection.

FIG. 13 is a diagram depicting simulated characteristics of Block Error Rate (BLER) in a case of beam selection. These simulated characteristics are a result of modulation methods of one-stream QPSK, one-stream 16 QMA, and two-stream 16 QAM. As depicted in FIG. 13, in beam selection, the characteristics are better when selection in the 5 MHz band using all resource blocks (black squares, circles, and triangles on continuous lines in FIG. 13) is carried out than when selection in resource blocks (white squares, circles, and triangles on dotted lines in FIG. 13) is carried out. FIG. 13 also depicts reference characteristics resulting from 1×2 transmission (by which one data stream is transmitted with one transmission antenna and two reception antennas) and 2×2 transmission (by which two data streams are transmitted with two transmission antennas and two reception antennas) (single-dot chain lines in FIG. 13).

In the antenna selection of FIG. 12, selection in resource blocks has brought characteristics improved by about 1 dB at maximum, thanks to a transmission selection diversity effect. In the beam selection of FIG. 13, on the contrary, selection in the whole 5 MHz band has brought characteristics that are better than characteristics resulting from selection in resource blocks by about 1 dB at maximum. This is because that, with a coherent band in beam selection broader than the frequency width of a resource block, highly precise beam selection has been performed by averaging SINRs of a plurality of resource blocks to select an optimum beam.

In other words, in antenna selection, transmitted energy arrives at a destination even if selection precision is slightly inferior, so that only the lower communication quality results due to inferior selection precision. In beam selection, however, energy hardly reaches its destination when wrong beam selection is made, so that more precise beam selection is desired. Highly precise beam selection is achieved by the above method of weight determination and of transmitting feedback information according to the embodiment. It is desirable, therefore, that the base station 100 be capable of switching between beam selection and antenna selection to carry out not only beam selection but also antenna selection.

Figure 14:
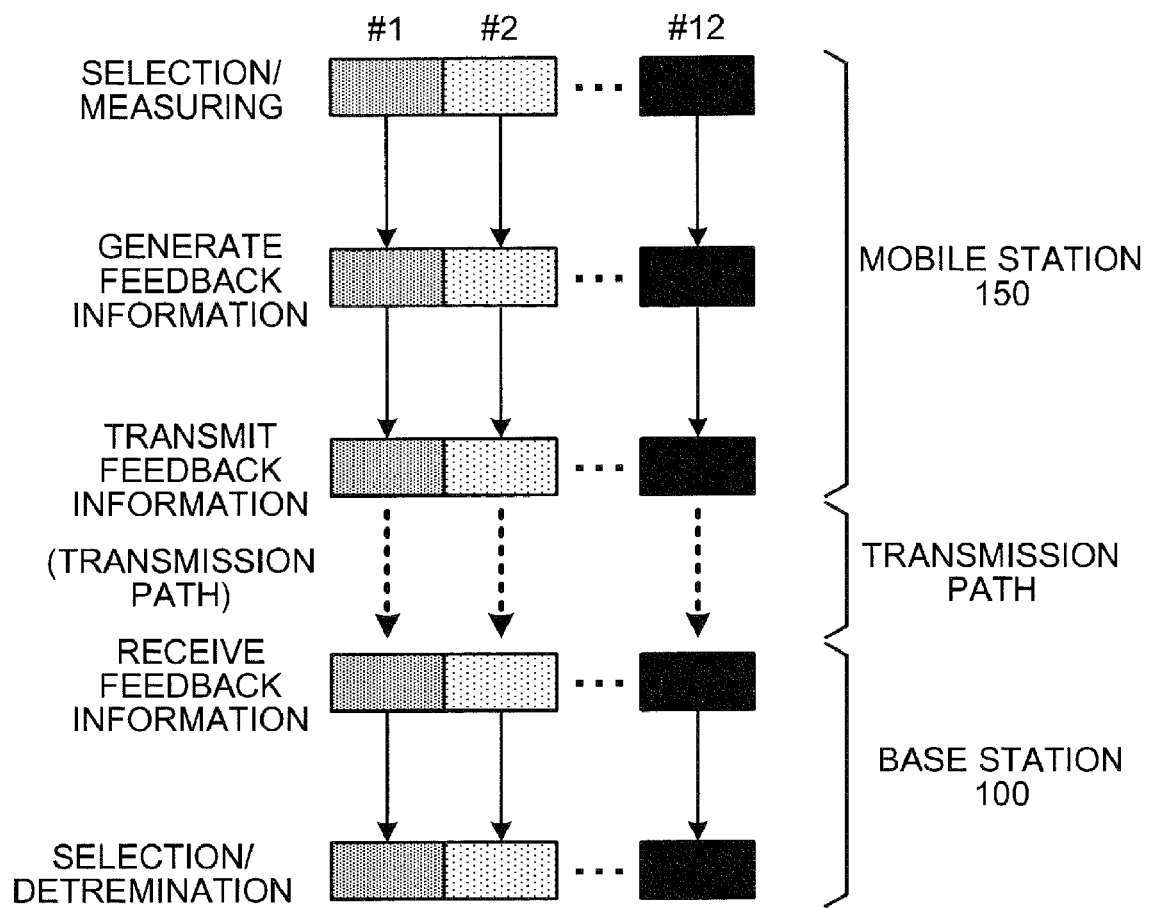
FIG. 14 is a diagram depicting a method of transmitting feedback information in a case of antenna selection.

FIG. 14 is a diagram depicting a method of transmitting feedback information in a case of antenna selection, a method of transmitting feedback information using an existing technique. As depicted in FIG. 14, the mobile station 150 carries out beam measurement resource block by resource block to generate feedback information, and transmits the feedback information to the base station 100 via the transmission path. The contents of the feedback information on the transmission path vary in each resource block. Upon carrying out antenna selection, the base station 100 processes the feedback information resource block by resource block in separation.

Upon carrying out beam selection, in contrast, the base station 100 synthesizes the feedback information transmitted in resource blocks, as depicted in FIGS. 10 and 11. When compared, FIG. 10 and FIG. 14 are different from each other in that whether the feedback information processing by the base station 100 is the separated process or the synthesizing process. In this manner, the base station 100 carries out its reception process on the feedback information received in resource blocks as the process to be carried out resource block by resource block in separation in a case of antenna selection, and as the process of synthesizing the feedback information transmitted in resource blocks in a case of beam selection. This functional change makes the best use of advantages of both processes, which enables data transmission with improved transmission quality.

Figure 15:
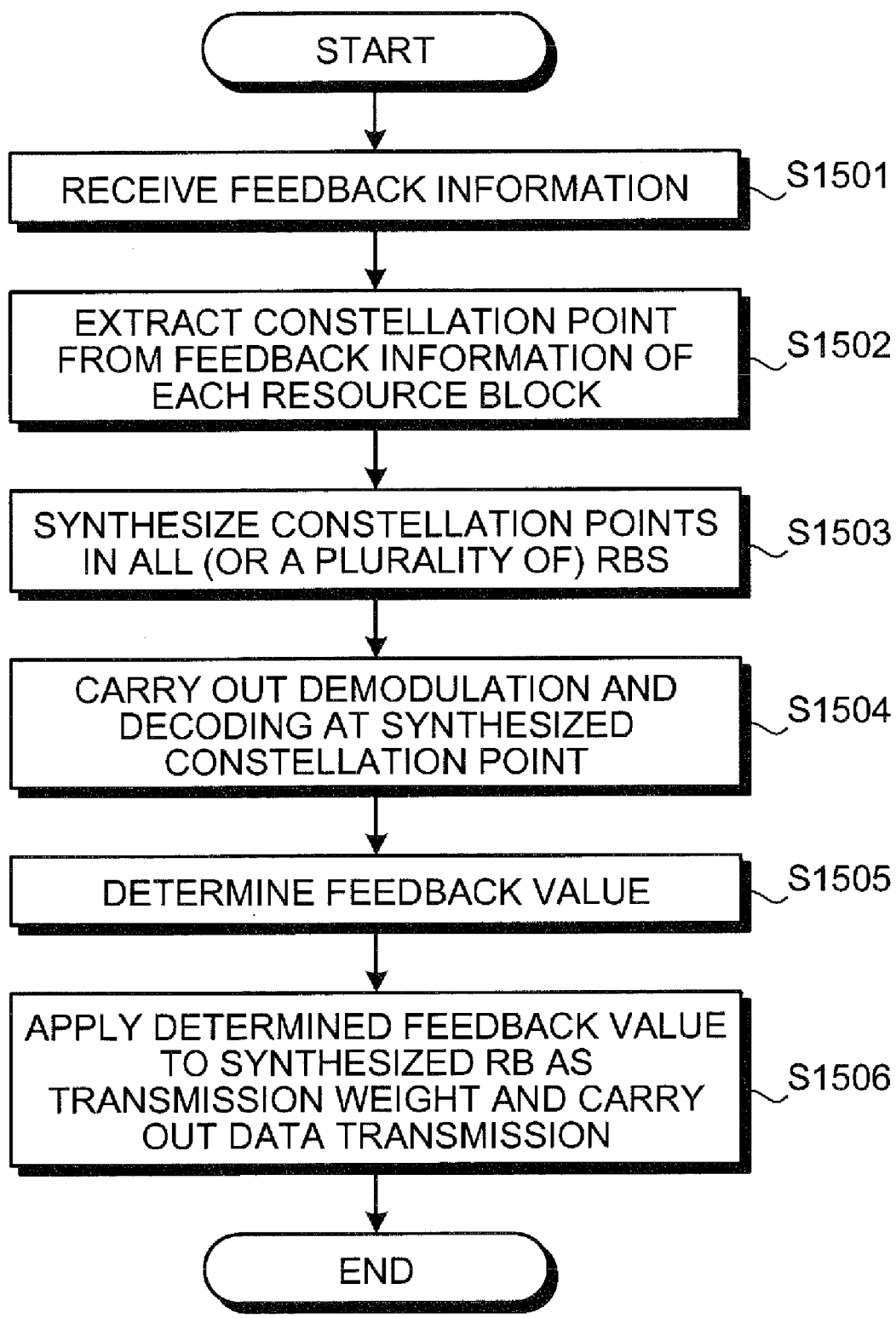
FIG. 15 is a flowchart depicting a feedback information reception process.

FIG. 15 is a flowchart depicting a feedback information reception process. FIG. 15 depicts a synthesizing process that the feedback information processing unit 110 of the base station 100 carries out in correspondence to the above first weight determining method carried out by the mobile station 150 (see FIG. 4). Feedback information is transmitted by a modulation method of QAM, etc., as data having a plurality of modulation constellation points. In this way, the feedback information is multiplexed and the throughput improves.

First, the feedback information from the mobile station 150 is received (step S1501). A modulation constellation point in feedback information of each resource block (RB) is extracted (step S1502), and extracted modulation constellation points in all or a plurality of resource blocks (RB) are synthesized (step S1503).

Demodulation and decoding are carried out at the synthesized constellation point (step S1504) to determine a feedback value (step S1505), at which one weight for a synthesized resource block is determined. The determined weight is applied to the synthesized resource block (RB) as a transmission weight, and the data transmission is performed (step S1506). Specifically, the control unit 106 applies the determined weight to the code book 102, carries out beam selection to select a transmission beam for the synthesized resource block (RB), and transmits data to the mobile station 150.

Figure 16:
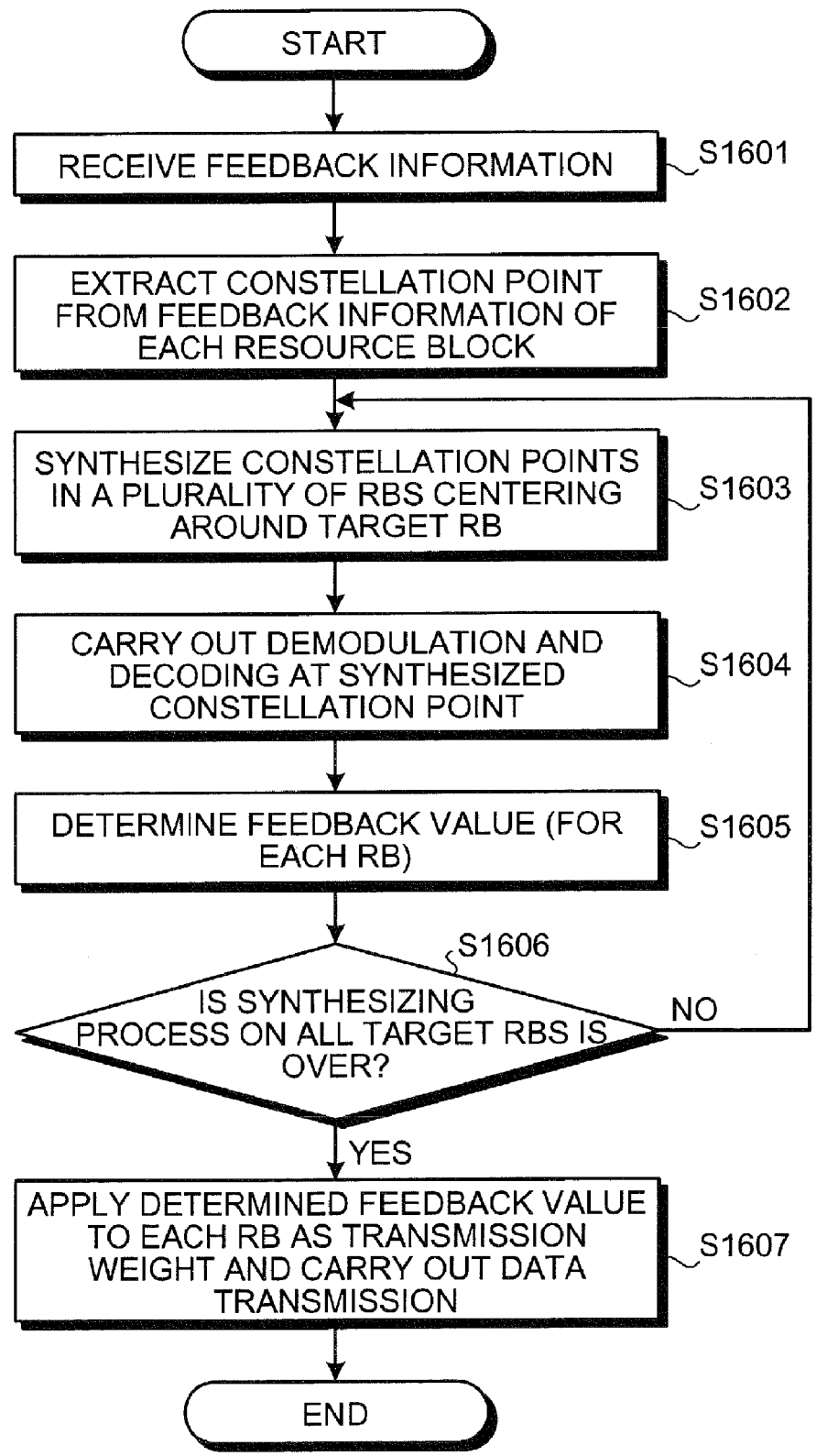
FIG. 16 is a flowchart depicting a feedback information reception process.

FIG. 16 is a flowchart of a feedback information reception process. FIG. 16 depicts a synthesizing process that the feedback information processing unit 110 of the base station 100 carries out in correspondence to the above third weight determining method carried out by the mobile station 150 (see FIG. 7).

Feedback information is transmitted by a modulation method of QAM, etc., as data having a plurality of modulation constellation points. First, the feedback information from the mobile station 150 is received (step S1601). A modulation constellation point in feedback information of each resource block (RB) is extracted (step S1602), and extracted modulation constellation points in resource blocks centering around a target resource block (RB) are synthesized (step S1603). Demodulation and decoding are carried out at the synthesized constellation point (step S1604) to determine a feedback value (step S1605), at which one weight for a synthesized resource block is determined.

Subsequently, whether the process on all target resource blocks (RB) is finished is determined (step S1606). When the process is not finished (step S1606: NO), the process flow returns to step S1603. When the process on all target resource blocks (RB) is finished (step S1606: YES), one determined weight is applied to the synthesized resource block (RB) as a transmission weight, and data transmission is carried out (step S1607). Specifically, the control unit 106 applies the determined weight to the code book 102, carries out beam selection to select a transmission beam for the synthesized resource block (RB), and transmits data to the mobile station 150.

Figure 17:
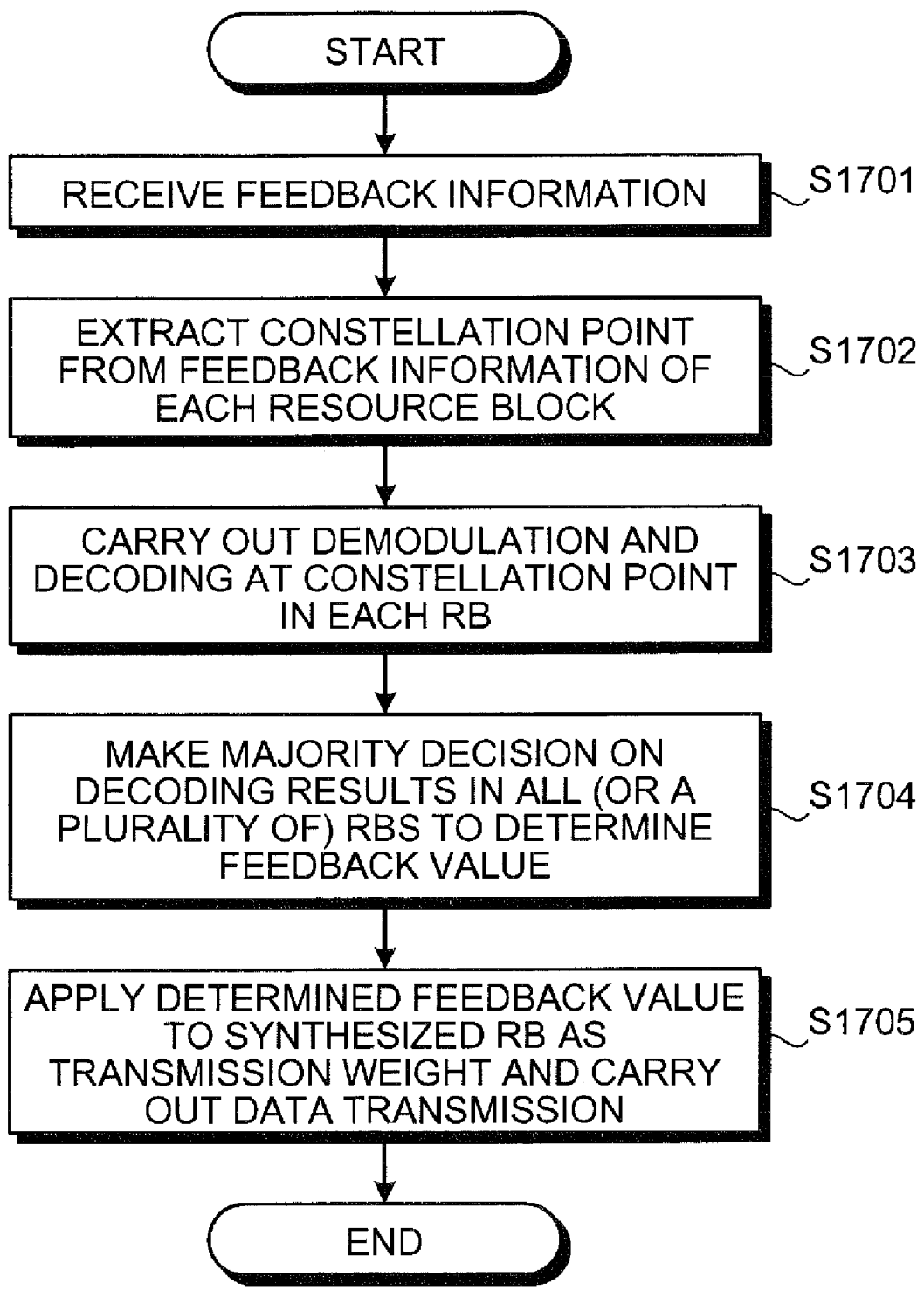
FIG. 17 is a flowchart depicting a feedback information reception process.

FIG. 17 is a flowchart of a feedback information reception process. FIG. 17 depicts a majority voting process that the feedback information processing unit 110 of the base station 100 carries out in correspondence to the above first weight determining method carried out by the mobile station 150 (see FIG. 4).

Feedback information is transmitted by a modulation method of QAM, etc., as having a plurality of modulation constellation points. First, the feedback information from the mobile station 150 is received (step S1701). A modulation constellation point in feedback information of each resource block (RB) is extracted (step S1702). Demodulation and decoding are carried out at constellation points of each resource block (RB) (step S1703).

Subsequently, majority decision is made on decoding results in all or a plurality of resource blocks (RB) to determine a feedback value (step S1704), at which one weight is determined by majority decision. The determined weight is applied to a synthesized resource block (RB) as a transmission weight, and data transmission is carried out (step S1705). Specifically, the control unit 106 applies the determined weight to the code book 102, carries out beam selection to select a transmission beam for the synthesized resource block (RB), and transmits data to the mobile station 150.

Figure 18:
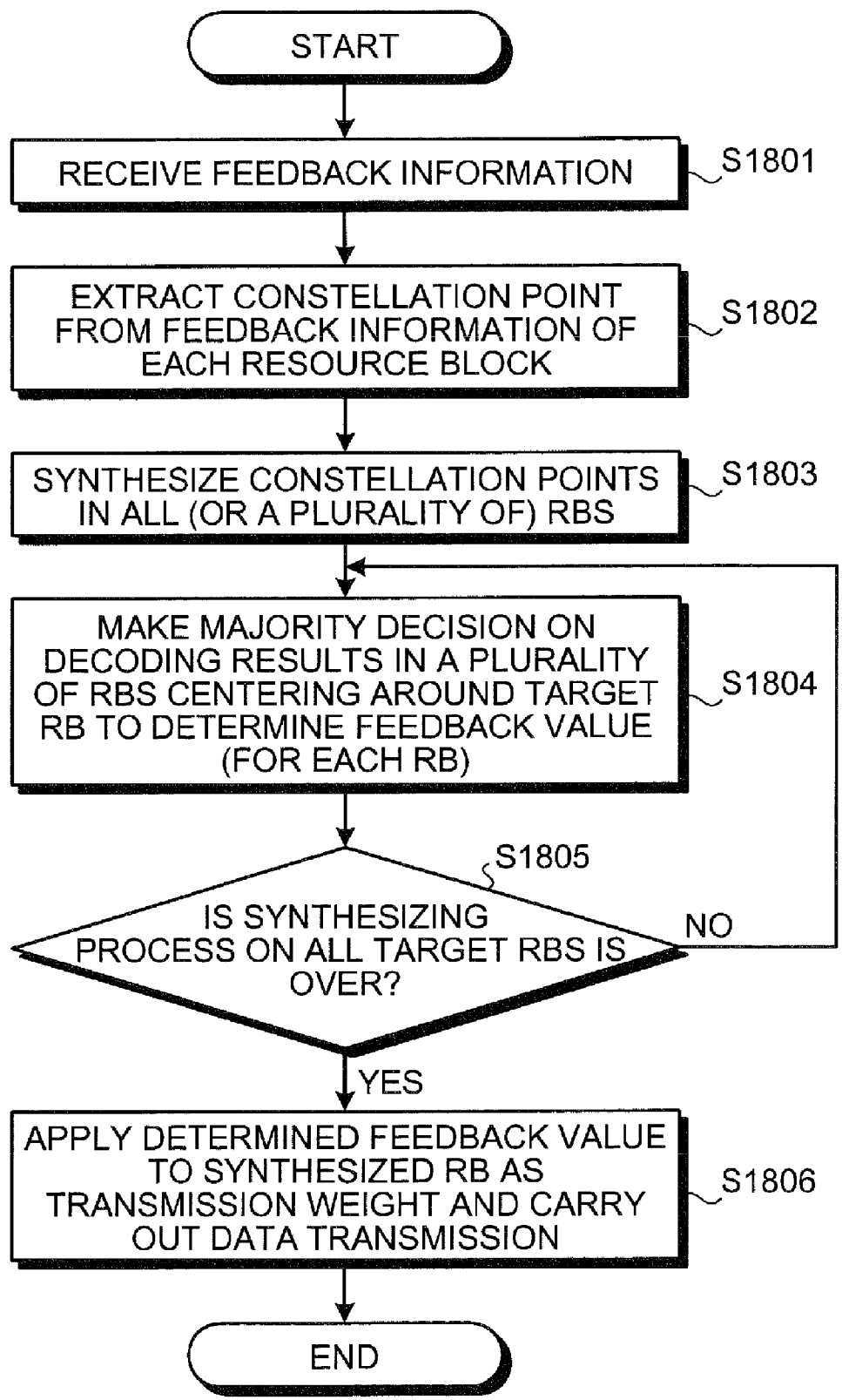
FIG. 18 is a flowchart depicting a feedback information reception process.

FIG. 18 is a flowchart of a feedback information reception process. FIG. 18 depicts a majority voting process that the feedback information processing unit 110 of the base station 100 carries out in correspondence to the above third weight determining method carried out by the mobile station 150 (see FIG. 7).

Feedback information is transmitted by a modulation method of QAM, etc., as having a plurality of modulation constellation points. First, the feedback information from the mobile station 150 is received (step S1801). A modulation constellation point in feedback information of each resource block (RB) is extracted (step S1802). Demodulation and decoding is carried out at a constellation point in each resource block (step S1803). Subsequently, majority decision is made on decoding results in a plurality of resource blocks (RB) centering around a target resource block (RB) to determine a feedback value (step S1804), at which one weight is determined by majority decision for each resource block.

Subsequently, whether the process on all target resource blocks (RB) is complete is determined (step S1805). When the process is not yet finished (step S1805: NO), the process flow returns to step S1804. When the process on all target resource blocks (RB) is finished (step S1805: YES), one determined weight is applied to the synthesized resource block (RB) as a transmission weight, and data transmission is carried out (step S1806). Specifically, the control unit 106 applies the determined weight to the code book 102, carries out beam selection to select a transmission beam for the synthesized resource block (RB), and transmits data to the mobile station 150.

In the reception processes described above, the synthesizing process is the process of synthesizing a plurality of pieces of feedback information transmitted through the transmission path, and thus reduces signal errors in the feedback information. The majority decision process, on the other hand, improves the accuracy of the contents of a plurality of pieces of feedback information transmitted through the transmission path.

Figure 19:
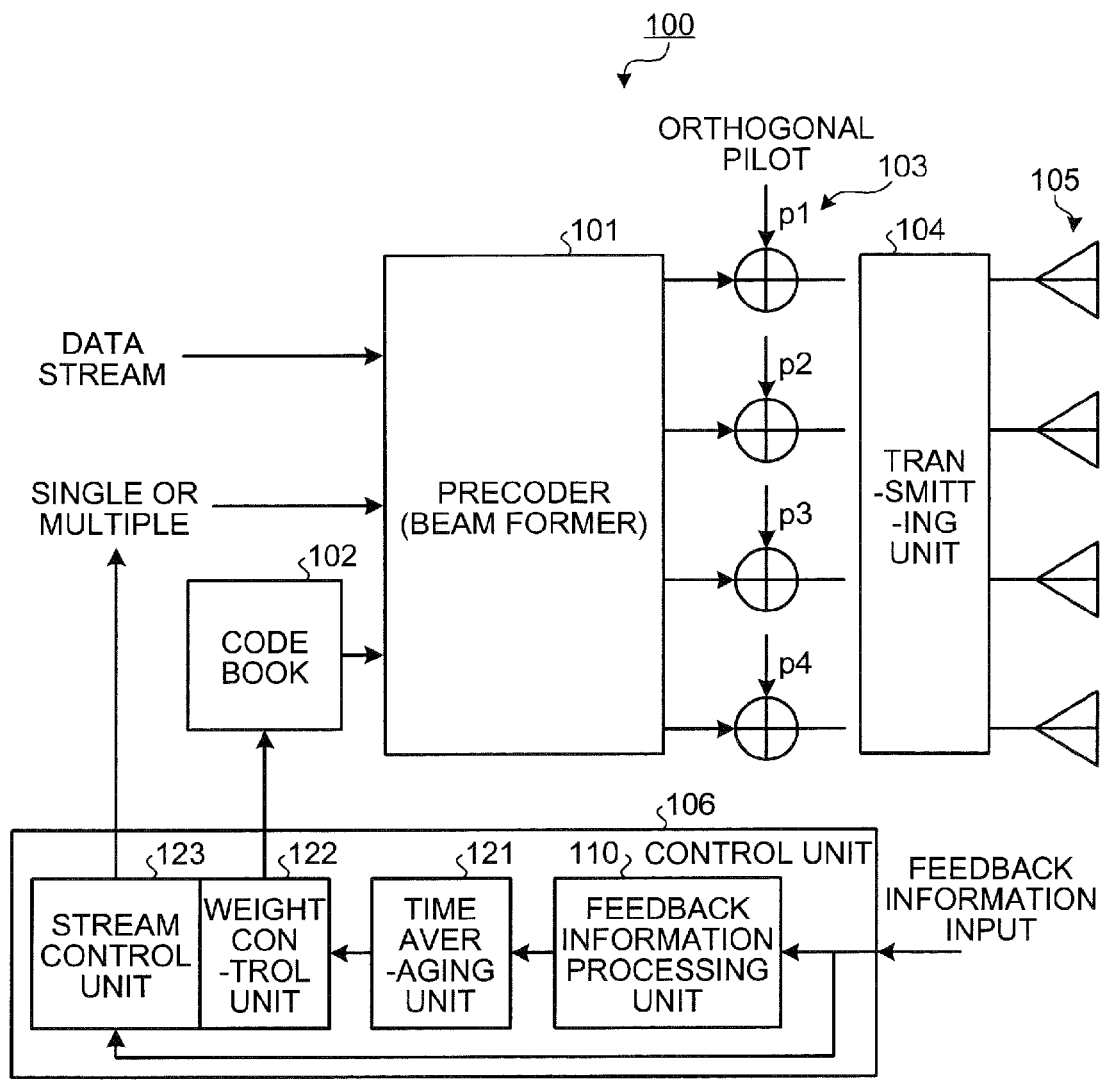
FIG. 19 is a block diagram of a configuration for execution of a feedback information reception process.

FIG. 19 is a block diagram of a configuration for execution of a feedback information reception process. FIG. 19 depicts the configuration in which the control unit 106 in the base station 100 time-averages feedback information. The feedback information processing unit 110 incorporated in the control unit 106 executes the above first to fourth feedback information reception processes. As depicted in FIG. 19, the control unit 106 has other components receiving outputs from the feedback information processing unit 110: namely a time averaging unit 121, a weight control unit 122, and a stream control unit 123.

The time averaging unit 121 time averages output from the feedback information processing unit 110. Specifically, the time averaging unit 121 averages a feedback value (weight) having been subjected to the reception process as feedback information in given times. The weight control unit 122 applies the weight time averaged by time averaging unit 121 to the code book 102 to control readout from the code book 102. The stream control unit 123 controls the number of data streams to transmit, based on the number of data streams contained in the feedback information, to form the data streams into a single data stream (one stream) or into multiple data streams (two or more streams).

Figure 20:
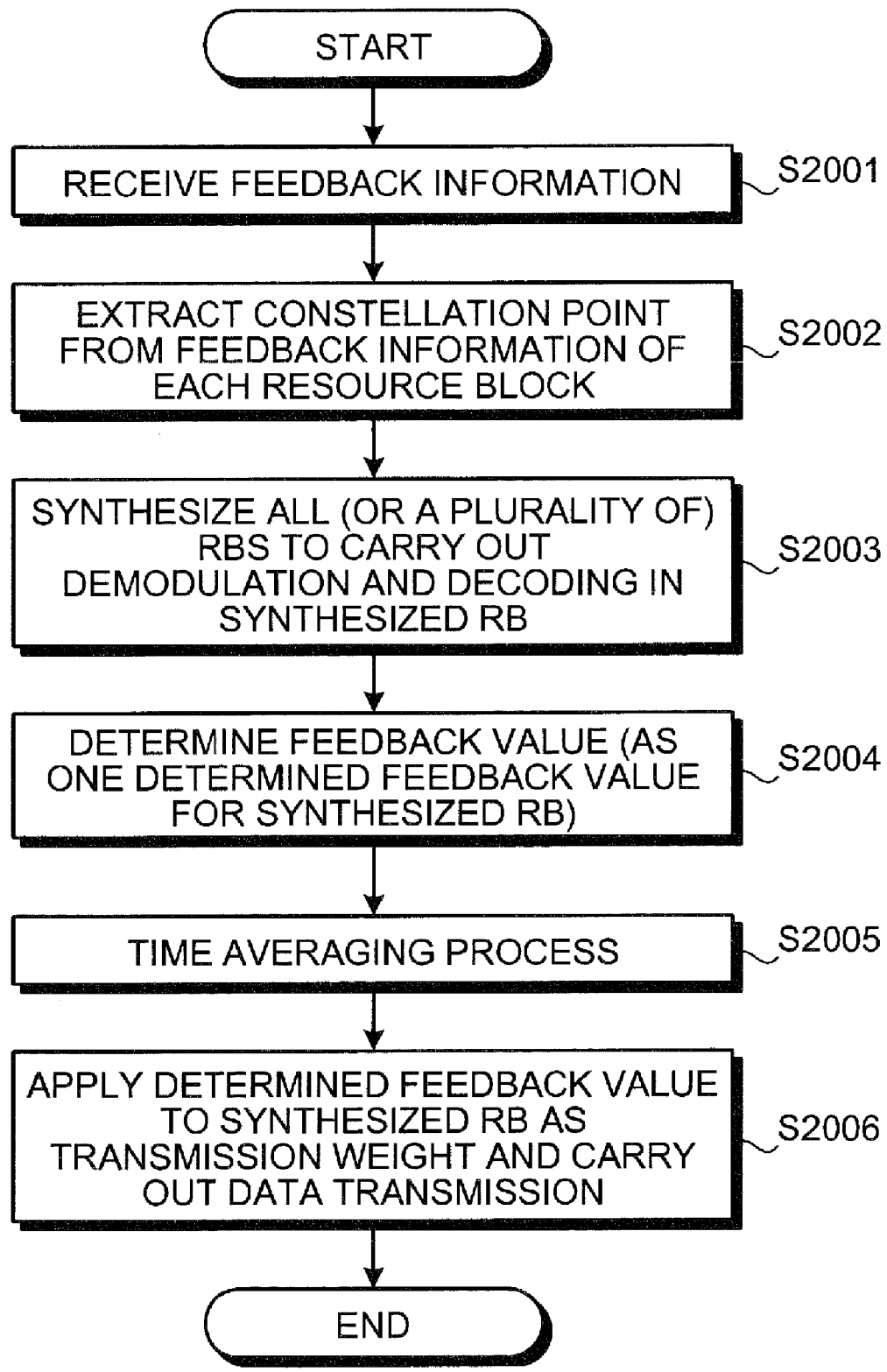
FIG. 20 is a flowchart depicting a feedback information reception process.
Figure 21:
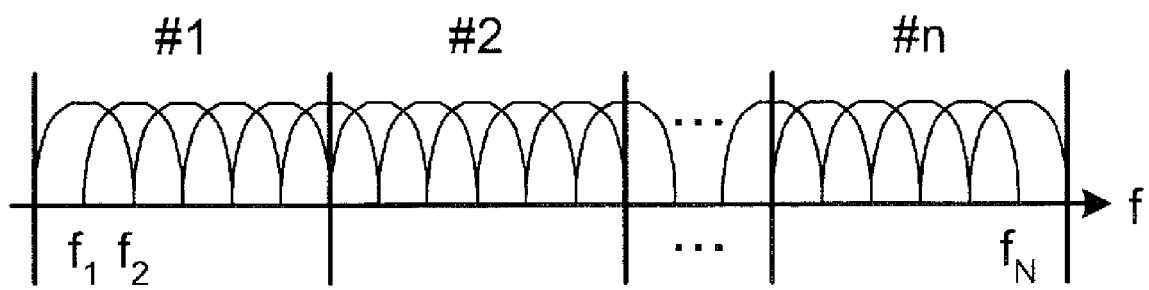
FIG. 21 depicts resource blocks in OFDMA.
Figure 22:
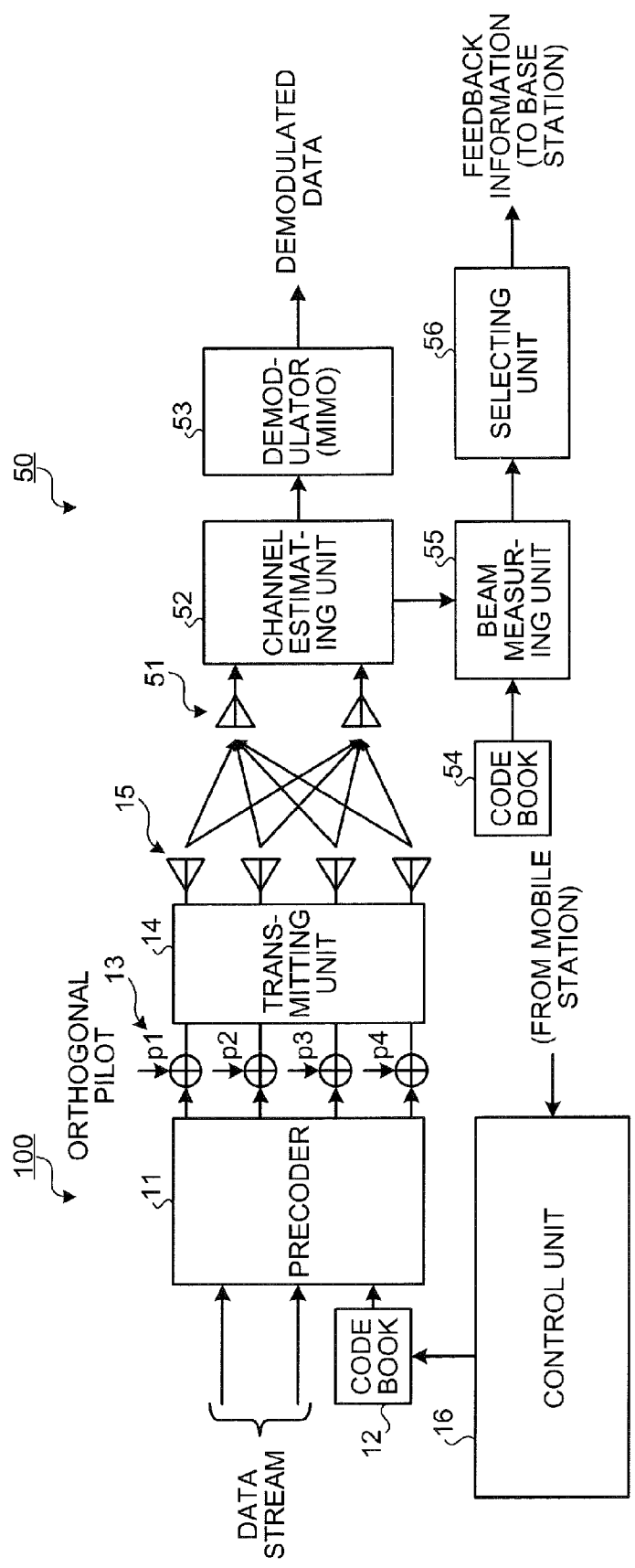
FIG. 22 is a block diagram of a conventional radio communication system.
Figure 23:
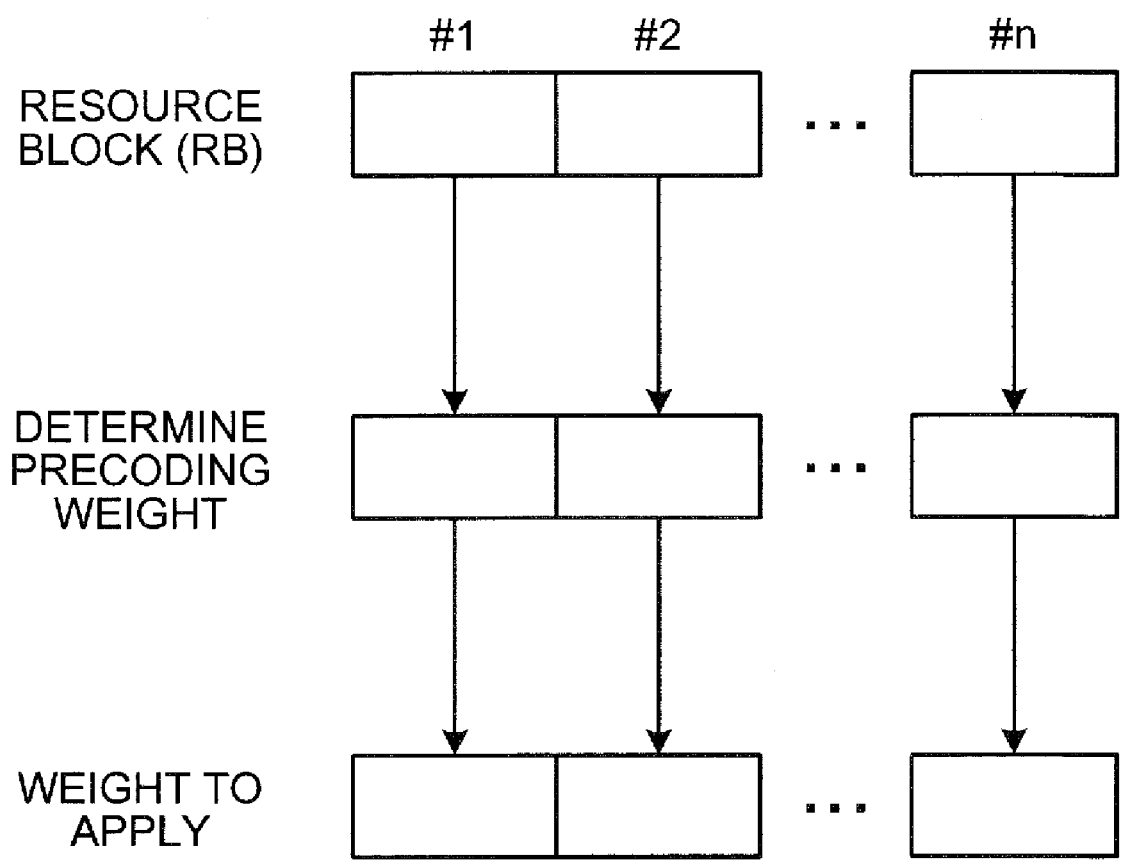
FIG. 23 is a diagram depicting a conventional method of determining a weight.

FIG. 20 is a flowchart of a feedback information reception process. Reception process steps according to any one of the above first to fourth reception processes (summarized as steps S2001 to S2004) are executed, and an acquired feedback value is subjected to a time averaging process (step S2005). The time averaged feedback value is applied to a synthesized resource block (RB) as a transmission weight, and data transmission is carried out (step S2006).

In this manner, through the time averaging process, the contents of feedback information is determined in given times. As a result, the base station 100 is hardly influenced by fluctuation of the transmission state of the transmission path, and thus becomes able to acquire an accurate weight value applied into readout from the code book 102 to improve the precision of beam selection.

In the above embodiments, the configuration of precoding MIMO is described as an example where data from a plurality of users are subjected to beam selection on multiple beams and is transmitted as a selected beam. In addition to this example, precoding MIMO can also apply to a configuration in which data from a single user is input in the form of a single data stream and is transmitted as a beam created by beam forming. OFDMA, the multiple access technique regarded as the most likely candidate for MIMO application, is described in terms of frequency blocks that are resource blocks (RB) of the OFDMA. Besides this case, the concept of resource block (RB) can be expanded for application to other multiple access techniques, such as FDMA (Frequency Division Multiple Access), TDMA (Time Division Multiple Access), and CDMA (Code Division Multiple Access). In these applications, the element corresponding to the resource block (RB) can be used as frequency in FDMA, as time slot in TDMA, and as spread code in CDMA.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A system comprising:
a mobile station that receives multibeam data in precoding Multiple Input Multiple Output from a base station, using a plurality of antennas, including:
a first code book that includes contents identical to contents of a second code book installed in the base station and that includes information of beam selection for precoding; and
a first control unit that determines a weight for carrying out optimum beam selection for precoding at time of searching information in the first code book, based on a state of a beam in each resource block of received data that is divided into a plurality of resource blocks in a radio communication band, to transmit the weight as feedback information to the base station, and yields one weight from a plurality of resource blocks; and
a base station that transmits the multibeam data selected by beam selection in precoding Multiple Input Multiple Output to the mobile station including:
the second code book that includes information of beam selection for precoding set in the second code book;
a precoder that reads the second code book to carry out a process of beam forming for selecting a given beam;
a second control unit that controls reading of the information of beam selection from the second code book, based on the feedback information from the mobile station; and
a transmitting unit that transmits the data using the radio communication band divided into a plurality of resource blocks, wherein
the second control unit has a feedback information processing unit that receives the feedback information from the mobile station, the feedback information processing unit extracting the weight for carrying out optimum beam selection for precoding at time of searching information in the second code book from the feedback information for each resource block to synthesize the extracted weights for a plurality of resource blocks.

2. The mobile station of claim 1, wherein
the first control unit synthesizes states of the beams to determine one weight for a plurality of resource blocks.

3. The mobile station of claim 1, wherein
the first control unit divides a plurality of resource blocks into a plurality of blocks, and synthesizes states of the beams to determine one weight for each of the divided blocks.

4. The mobile station of claim 1, wherein
the first control unit determines one weight based on a state of the beam for each of a plurality of resource blocks by synthesizing signal states of the beams in a plurality of resource blocks centering around a target resource block in close vicinity thereto to determine one weight.

5. The mobile station of claim 1, comprising an output unit that copies one determined weight to every resource blocks to transmit feedback information of identical contents using the resource blocks to the base station.

6. The mobile station of claim 1, comprising an output unit that copies one determined weight to one or a plurality of resource blocks of the resource blocks, the mobile station transmitting a plurality of pieces of feedback information of identical contents using the resource blocks to the base station while using leftover resource blocks for transmission of other information.

7. The base station of claim 1, wherein
when the received feedback information includes information different from weight information, the feedback information processing unit extracts the information different from weight information.

8. The base station of claim 1, wherein
the second control unit controls data transmission by switching the beam selection for the antenna selection or the antenna selection for the beam selection, and wherein
the feedback information processing unit does not carry out the weight synthesizing process but carry out a separate process for each resource block at time of antenna selection.

9. The base station of claim 1, wherein
the feedback information is modulated by a given modulation technique and is transmitted, and wherein
the feedback information processing unit synthesizes the weights that are extracted after a modulated signal is demodulated and decoded at respective constellation points.

10. The base station of claim 1, wherein
the feedback information is modulated by a given modulation technique and is transmitted, and
the feedback information processing unit makes a majority decision on the weights that are extracted after a modulated signal is demodulated and decoded at respective constellation points.

11. The base station of claim 1, wherein
the feedback information processing unit averages the received feedback information in given times.

12. The mobile station of claim 3, wherein
the first control unit also synthesizes states of the beams in a given number of resource blocks in another block adjacent to the blocks to acquire a synthesized signal state as information of the weight determination.

13. The mobile station of claim 4, wherein
the first control unit gives lighter weight to a resource block in synthesization as the resource block gets farther away from the target resource block.

14. A radio communication method, comprising:
controlling read-out of information on beam selection based on feedback information; and
transmitting data after dividing a radio communication band into a plurality of resource blocks,
wherein the controlling includes:
receiving the feedback information;
extracting weights for the resource blocks from the feedback information; and
synthesizing the weights,
the feedback information is modulated and transmitted, and
the weights are synthesized after a modulated signal is demodulated and decoded at respective constellation points.

* * * * *